United States Patent
Kosuda et al.

(10) Patent No.: US 7,065,668 B2
(45) Date of Patent: Jun. 20, 2006

(54) APPARATUS FOR SELECTING AND OUTPUTTING EITHER A FIRST CLOCK SIGNAL OR A SECOND CLOCK SIGNAL

(75) Inventors: Tsukasa Kosuda, Suwa (JP); Motomu Hayakawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/936,986

(22) Filed: Sep. 9, 2004

(65) Prior Publication Data

US 2005/0030112 A1    Feb. 10, 2005

Related U.S. Application Data

(62) Division of application No. 09/823,137, filed on Mar. 29, 2001, now abandoned.

(30) Foreign Application Priority Data

| Mar. 31, 2000 | (JP) | ............................... 2000-100122 |
| Mar. 31, 2000 | (JP) | ............................... 2000-100123 |
| Mar. 27, 2001 | (JP) | ................................ 2001-91111 |

(51) Int. Cl.
*G06F 1/04* (2006.01)

(52) U.S. Cl. ........................................ 713/500; 331/46

(58) Field of Classification Search ................ 713/500, 713/501, 502; 327/155, 156; 331/46, 49, 331/54, 2

See application file for complete search history.

(56) References Cited

U.S. PATENT DOCUMENTS

| 5,151,613 A | * | 9/1992 | Satou et al. ................... 327/99 |
| 5,196,810 A | * | 3/1993 | Graether et al. .............. 331/49 |
| 5,475,324 A | * | 12/1995 | Tomiyori .................... 327/145 |
| 5,606,293 A | * | 2/1997 | Matsui et al. ................. 331/74 |
| 5,623,234 A | * | 4/1997 | Shaik et al. .................. 331/49 |
| 5,689,430 A | | 11/1997 | Ohno et al. |
| 5,754,081 A | * | 5/1998 | Kuroiwa et al. .............. 331/49 |
| 5,774,701 A | * | 6/1998 | Matsui et al. ............... 713/501 |
| 5,883,533 A | * | 3/1999 | Matsuda et al. ............. 327/156 |
| 5,936,473 A | * | 8/1999 | Taniguchi et al. ............ 331/14 |
| 6,140,851 A | * | 10/2000 | Akita ........................ 327/156 |

FOREIGN PATENT DOCUMENTS

| JP | 6-112818 | 4/1994 |
| JP | 10-206568 | 8/1998 |
| JP | 10-213686 | 8/1998 |

* cited by examiner

*Primary Examiner*—Lynne H. Browne
*Assistant Examiner*—Paul Yanchus
(74) *Attorney, Agent, or Firm*—Mark P. Watson

(57) ABSTRACT

By using a CR oscillating circuit and a PLL oscillating circuit selectively, these two oscillating circuits are used as a high frequency, low power consumption, short waiting time for stable oscillation, and low operating voltage oscillating circuit.

9 Claims, 17 Drawing Sheets

OPTICAL PATTERN ON PULSE NUMBER DETERMINING UNIT

1/4 PERIOD PHASE DIFFERENCE

EXAMPLE VALUE IN PARENTHESIS

EXAMPLE VALUE IN PARENTHESIS

FIG. 13    258: VOLTAGE GENERATING UNIT
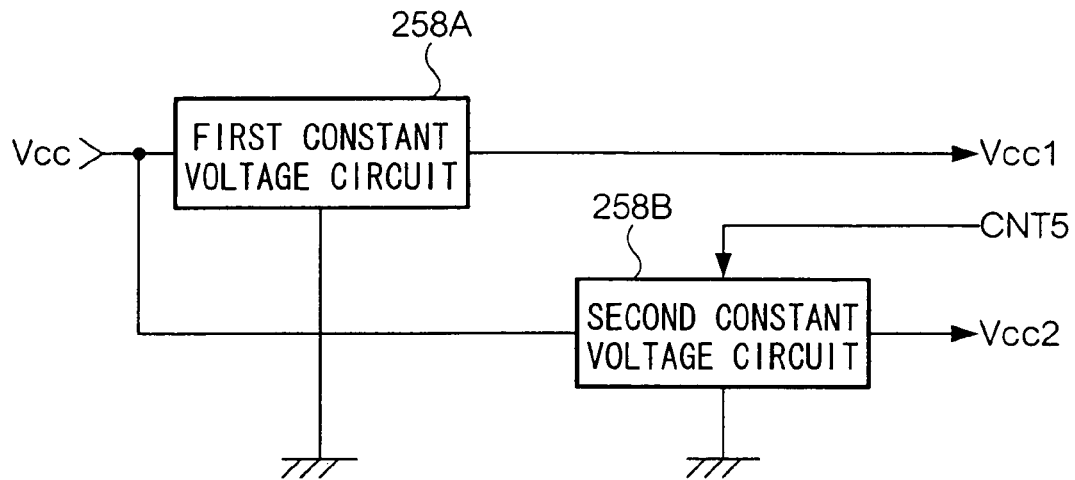
FIG. 19
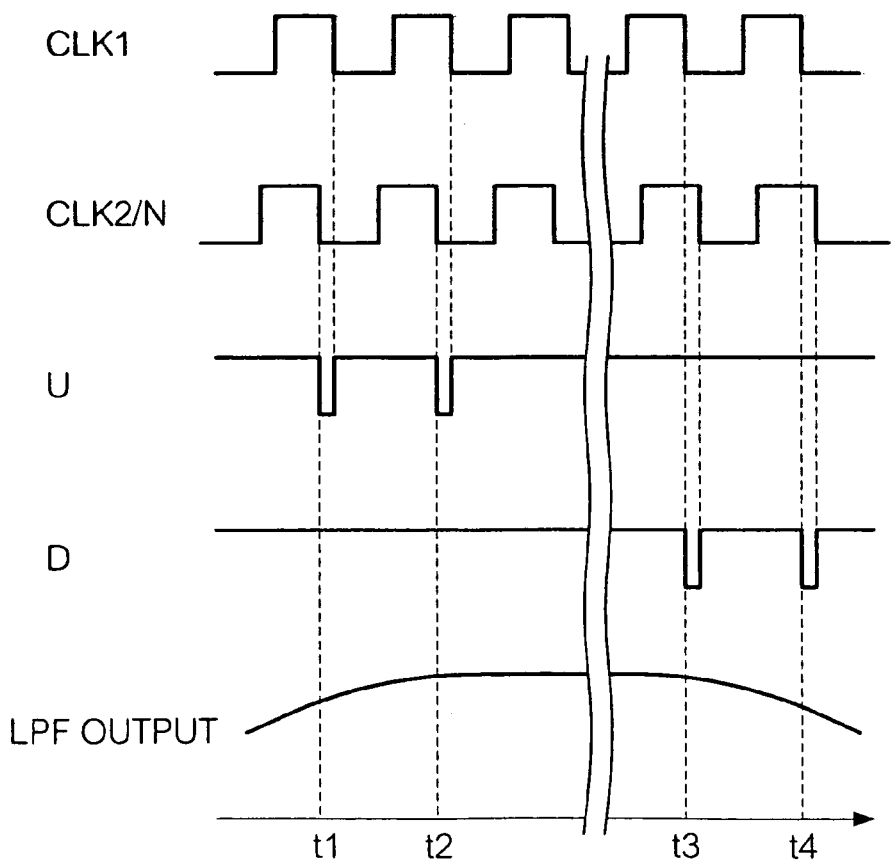

$T_1 = CR_1$
$T_2 = CR_2$

TRU : LOCK UP TIME

APPARATUS FOR SELECTING AND OUTPUTTING EITHER A FIRST CLOCK SIGNAL OR A SECOND CLOCK SIGNAL

CONTINUING APPLICATION DATA

This application is a divisional of U.S. patent application Ser. No. 09/823,137 filed Mar. 29, 2001, now abandoned. The contents of this prior application are incorporated herein by reference in their entirety.

BACKGROUND OF THE INVENTION

1. Field of the Invention

The present invention relates to an information processing apparatus, and more particularly to a technology for reducing power consumption in an information processing apparatus that has an oscillating circuit.

2. Description of the Related Art

A small sized portable electronic apparatus usually works on batteries. Therefore, in order to extend the life of the battery, one-chip microcomputers used in this kind of small sized portable electronic apparatus are desired to be able to operate in low voltage and to be of low power consumption.

In order to realize this, one-chip microcomputers are usually driven at an operating voltage of around 1 voltage and at an operating frequency of around 32 kHz.

However, when small sized portable electronic equipment is required to have an information processing capability to some extent, the operating frequency of 32 kHz is not enough for processing information.

In order to solve this problem, a twin-clock microcomputer that has an oscillating circuit with a low operating frequency of around 32 kHz and an oscillating circuit with a high operating frequency of around 4 MHz is proposed. In this twin-clock microcomputer, when high speed processing is required the microcomputer is driven at a high speed operating frequency, otherwise it is driven at a low speed operating frequency.

Operating frequency and power consumption is in a roughly proportional relationship, for that reason high speed processing is not desirable from the viewpoint of power consumption.

However, recently, there is a demand for high speed information processing in small sized portable electronic apparatus, and at the same time much less power consumption is desired.

SUMMARY OF THE INVENTION

Accordingly, it is an object of the present invention to provide an information processing apparatus that has capabilities of lowering power consumption and achieving high speed information processing.

In order to achieve the above mentioned problem, the present invention provides an information processing apparatus comprising: a first oscillating circuit for generating a first clock signal, the first oscillating circuit being capable of operating until a power supply voltage reaches a first lowest operating voltage; a second oscillating circuit for generating a second clock signal, the second oscillating circuit being capable of operating until the power supply voltage reaches a second lowest operating voltage that is higher than the first lowest operating voltage; a switching circuit that, based on the power supply voltage, selects either the first clock signal or the second clock signal to output as a clock signal; and an information processing unit, in synchronism with the clock signal, for performing information processing.

According to the above configuration, the first oscillating circuit generates the first clock signal and outputs it to the switching circuit.

The second oscillating circuit generates the second clock signal and outputs it to the switching circuit.

The switching circuit, based on the power supply voltage, outputs either the first clock signal or the second clock signal as the clock signal.

By this, the information-processing unit executes various information processing based on the clock signal.

As a power supply, a normal power supply such as a battery or a constant-voltage regulated power supply such as a voltage regulator may be used.

Also, the present invention is characterized by providing an information processing apparatus comprising: a first oscillating circuit that generates a first clock signal by using oscillation and has a first oscillation stability time, the first oscillation stability time being a time required for the first oscillating circuit becoming stable from a beginning of the oscillation of the first oscillating circuit; a second oscillating circuit that starts oscillating concurrently with the first oscillating circuit, generates a second clock signal by using oscillation, and has a second oscillation stability time, the second oscillation stability being a time required for the second oscillating circuit becoming stable from a beginning of the oscillation of the second oscillating circuit, and being longer than the first oscillation stability time; a switching circuit for, based on an elapsed time from the beginning of the oscillation, outputting either the first clock signal or the second clock signal as the clock signal; and an information processing unit for, in synchronism with the clock signal, performing information processing.

By the above configuration, the first oscillating circuit generates the first clock signal and outputs it to the switching circuit.

The second oscillating circuit generates the second clock signal and outputs it to the switching circuit.

By this, the information-processing unit executes various information processing based on the clock signal.

Also, the present invention is characterized by providing a control method for an information processing apparatus, the information processing apparatus comprising: an information processing unit for, based on a clock signal, carrying out various information processing operations; a first oscillating circuit that generates a first clock signal and is able to operate until power supply voltage reaches a first lowest operating voltage, a second oscillating circuit that generates a second clock signal and is able to operate until the power supply voltage reaches a second lowest operating voltage that is higher than the first lowest operating voltage; a switching circuit for, based on the power supply voltage, outputting either the first clock signal or the second clock signal as the clock signal; and the control method comprising: determining power supply voltage; outputting by the switching circuit the first clock signal as the clock signal when the power supply voltage is equal to or higher than the first lowest operating voltage and lower than the second lowest operating voltage; and outputting by the switching circuit the second clock signal as the clock signal when the power supply voltage is higher than the second lowest operating voltage.

By the above configuration, during determining power supply voltage, power supply voltage is determined.

During outputting the first clock signal, when the power supply voltage determined during determining power supply voltage is equal to or higher than the first lowest operating voltage and lower than the second lowest operating voltage, the switching circuit outputs the first clock signal as the clock signal.

During outputting the second clock signal, when the power supply voltage is equal to or higher than the second lowest operating voltage, the switching circuit outputs the second clock signal as the clock signal.

Also, the present invention is characterized by providing a control program executed by an information processing apparatus, the information processing apparatus comprising: an information processing unit for, based on a clock signal, carrying out various information processing operations; a first oscillating circuit that generates a first clock signal and is able to operate until power supply voltage reaches a first lowest operating voltage, a second oscillating circuit that generates a second clock signal and is able to operate until the power supply voltage reaches a second lowest operating voltage that is higher than the first lowest operating voltage; and a switching circuit for, based on the power supply voltage, outputting either the first clock signal or the second clock signal as the clock signal; and the control program comprising the routines of determining the power supply voltage; outputting to the switching circuit the first clock signal as the clock signal when the power supply voltage is equal to or higher than the first lowest operating voltage and is lower than the second lowest operating voltage; and outputting to the switching circuit the second clock signal as the clock signal when the power supply voltage is higher than the second lowest operating voltage.

By the above configuration, the control program makes the information processing apparatus determine power supply voltage, when the power supply voltage is equal to or higher than the first lowest operating voltage and lower than the second lowest operating voltage, makes the switching circuit output the first clock signal as the clock signal, and when the power supply voltage is equal to or higher than the second lowest operating voltage, makes the switching circuit output the second clock signal as the clock signal.

BRIEF DESCRIPTION OF THE DRAWINGS

FIG. 13 is a detailed configuration block diagram of the voltage generating unit in the information processing apparatus.

FIG. 19 is a timing chart showing the operation of the phase comparator and the charge pump.

DETAILED DESCRIPTION

With reference to drawings, preferred embodiments of the present invention will be described below.

[1] FIRST EMBODIMENT

[1.1] Configuration of the First Embodiment

[1.1.1] Mechanical Configuration

Figure 1:
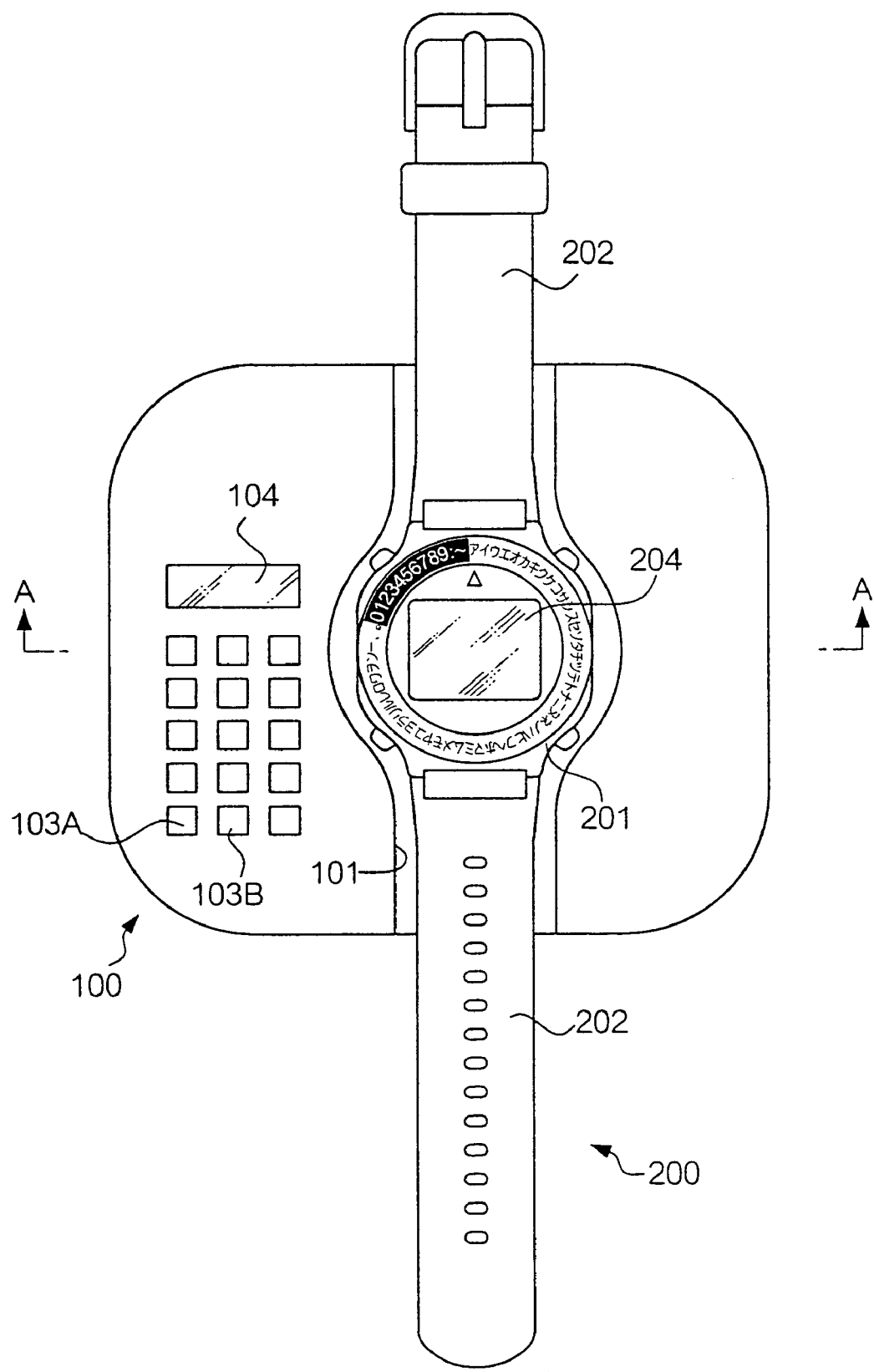
FIG. 1 is a plan view that shows a configuration of a watch-type information processing apparatus and a station of a first embodiment.

FIG. 1 shows a plan view of a watch-type information processing apparatus and a station according to the first embodiment. In FIG. 1, a watch-type information processing apparatus 200 has a secondary battery as a power source and receives power from the secondary battery, thereby able to function as a watch and an information processing apparatus. In more detail, the watch-type information processing apparatus 200, when used normal way, is worn on a user's wrist, displays date and time on a display section 204, and has an information-processing function that periodically measures and stores biological information such as pulse rate and heart rate by using sensor (not shown). The station 100 is a device used for charging the secondary battery of the watch-type information processing apparatus 200 and for data transferring with the watch-type information processing apparatus 200. The station 100 has a concave portion 101 which is slightly bigger than the body 201 and a band 202 of the watch-type information processing apparatus 200. The watch-type information processing apparatus 200 is embedded in the concave portion 101.

The station 100 comprises various input units such as a charge start button 1031 for starting the charging and a transfer start button 1032 for starting the data transferring, and a display unit 104 for carrying out various display.

Figure 2:
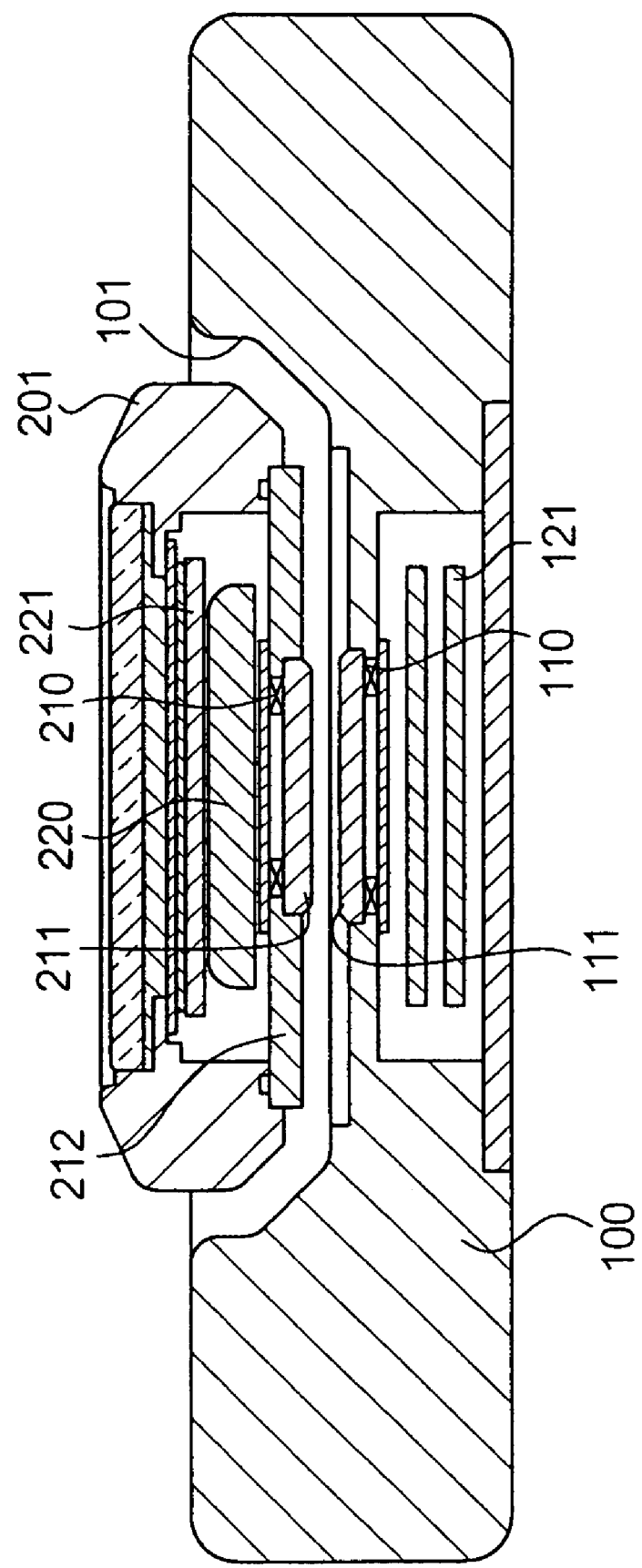
FIG. 2 is a section view taken on line A—A in FIG. 1.

FIG. 2 is a section view taken on line A—A in FIG. 1. As shown in FIG. 2, the underside of the body 201 of the watch-type information processing apparatus 200 is closed with a back cover 212. The watch-type information processing apparatus 200 is embedded in the station 100 in a manner by which the back cover 212 and the bottom of the concave portion 101 face each other. In a space inside the back cover of the body 201 is a circuit board 221 and the secondary battery 220 which provides the circuit on the circuit board 221 with power supply voltage. The back cover 212 has an opening which is closed by a cover glass 211. On the surface of the inner part of the cover glass 211, a watch-side coil 210 for data transferring and charging is placed.

On the other hand, at the bottom of the concave portion 101 of the station 100, there is space accommodating a circuit board 121. The board 121 is connected to the charge start button 103A, the transfer start button 103B, the display unit 104, and a primary battery (not shown). At the roof of the space is an opening which is closed with a cover glass 111. Inside the cover glass, a station-side coil 110 is fixed. The station-side coil 110 faces the watch-side coil 210 of the body through the cover glass 111 of the station 100 and the cover glass 211 of the body.

In this way, in a case where the watch-type information-processing apparatus 200 is placed in the station 100, the station-side coil 110 is not in physically contact with the watch-side coil 210 because of the cover glasses 111 and 211. However, the coils 110 and 210 are in electromagnetic contact with each other, because the coils are placed in almost parallel.

The station-side coil 110 and the watch-side coil 210 are of magnetic coreless type in order to avoid magnetization of the watch mechanism section, weight increase of the watch, and exposure of magnetic metal. However, if the invention is applied to an electronic apparatus to which the above matters are not important, coils with magnetic core may be used. However, when signal frequency provided to coil is high enough, a coreless coil works well enough.

Figure 3:
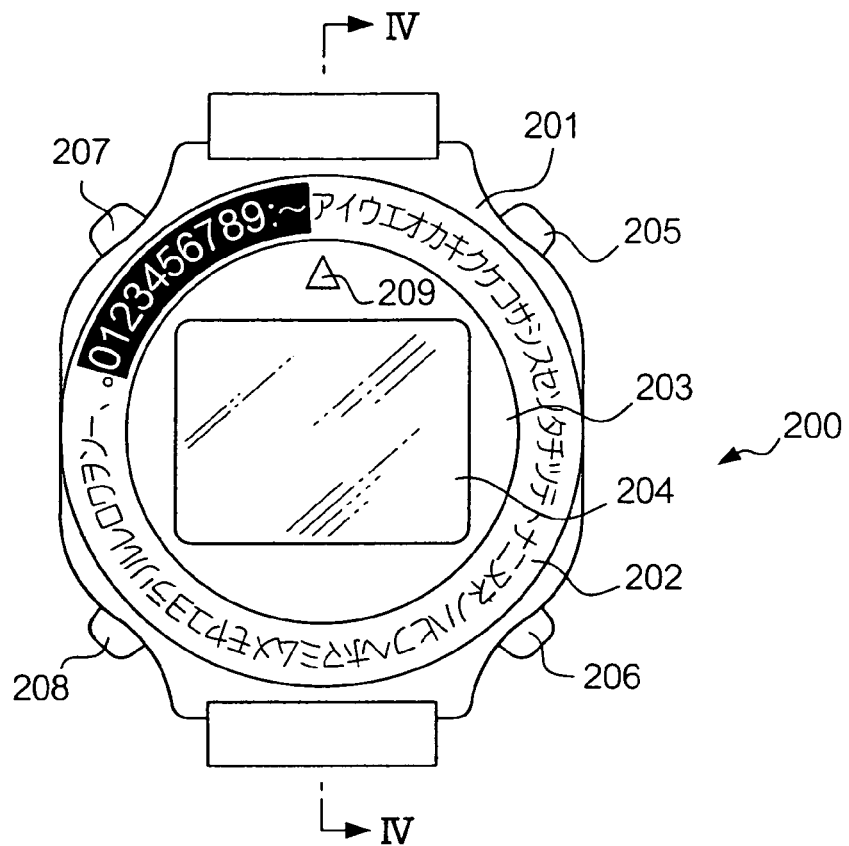
FIG. 3 is a front view of a watch-type information processing apparatus according to an embodiment of the present invention.

FIG. 3 is a front view of a watch-type information processing apparatus. On the front side (on near side of the drawing sheet) of the body 201, a circle shaped turning bezel 202 is placed so that the turning bezel 202 can slide on the body 201. On the turning bezel 202, characters (such as alphabetic characters, Japanese syllabaries, and/or numeric characters) are placed at regular intervals by printing.

Inside the turning bezel 202, a cover glass 203 is attached. Below the cover glass 203 (on the far side of the drawing sheet), the display section 204 is fixed that displays information input to the watch-type information processing apparatus 200. On the upper side of the display section 204, an indicator mark 209 is formed by printing or the other method. The indicator mark 209 indicates one of the characters on the turning bezel 202. Around the body 201, a confirmation switch 205, a delete switch 206, a sonant mark switch 207, and a starting point switch 208 are built. These switches may be built on the cover glass 203.

Figure 4:
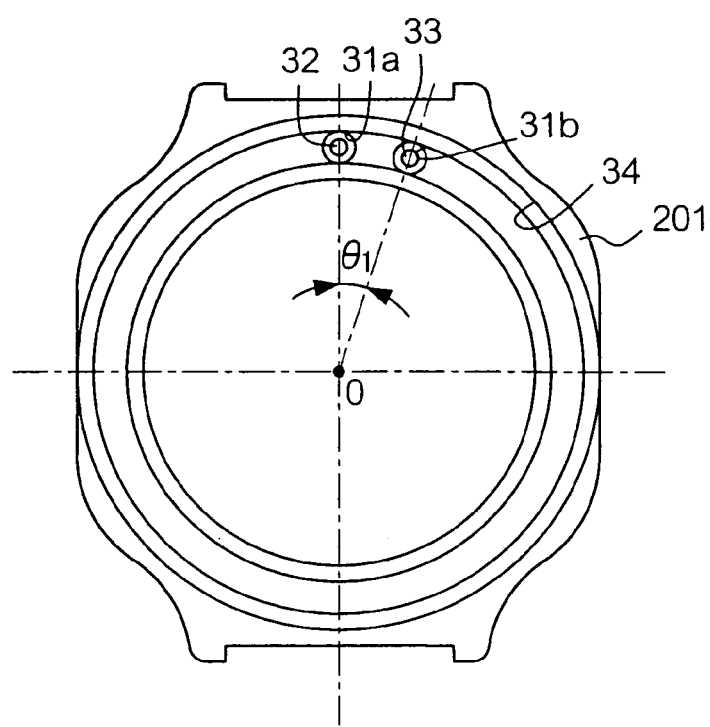
FIG. 4 is a diagram that shows a state of the information processing apparatus whose turning bezel is removed.
Figure 5:
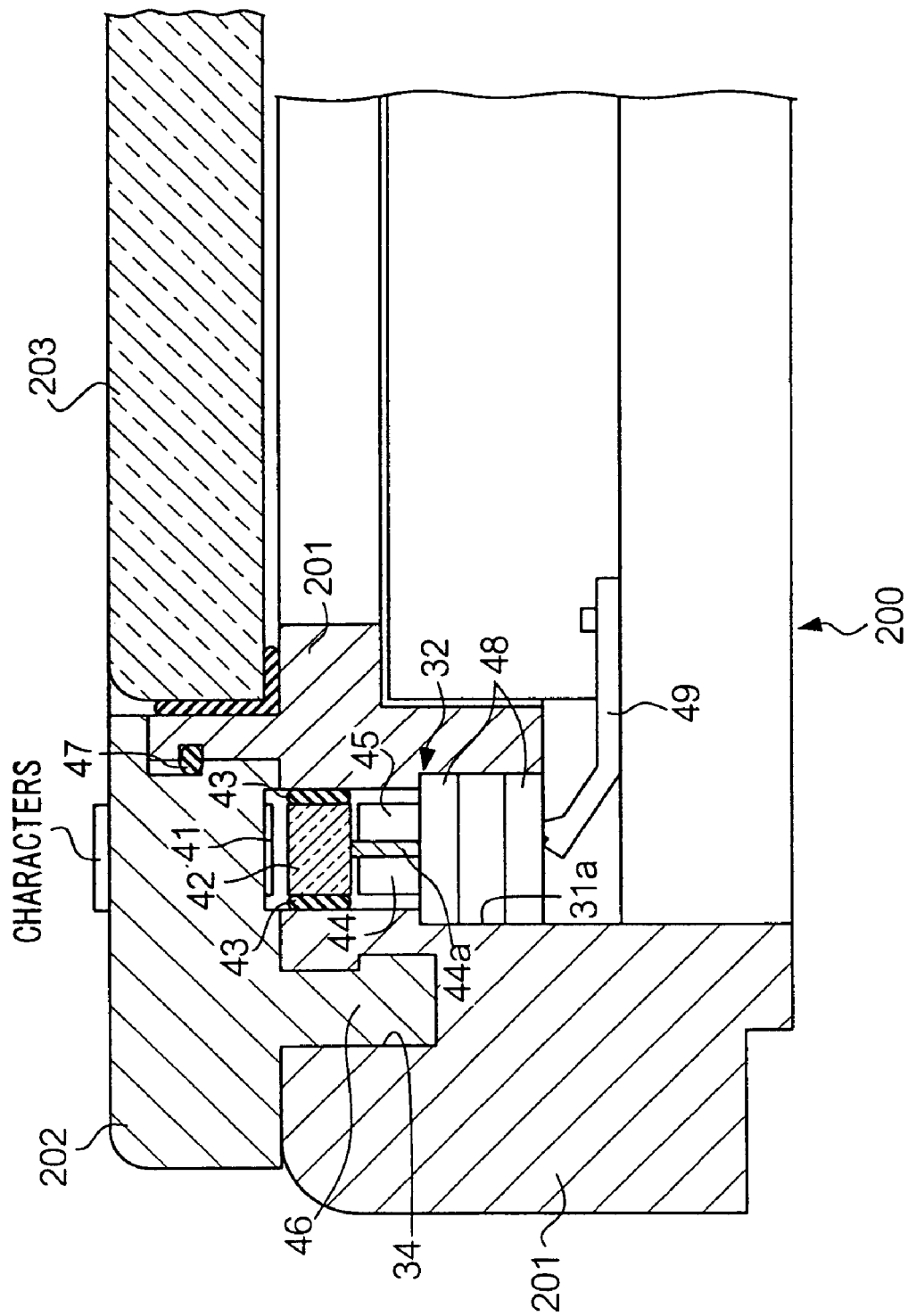
FIG. 5 is a section view taken on line IV—IV in FIG. 3.

FIG. 4 is a diagram that shows a state of the information processing apparatus 200 whose turning bezel 202 is removed. FIG. 5 is a section view taken on line IV—IV in FIG. 4. As shown in FIGS. 4 and 5, on the body 201, a gutter 34 is formed along the circle. On the other hand, as shown in FIG. 5, on the undersurface of the turning bezel 202 is formed a protrusive line 46 that protrudes towards inner side of the body. The protrusive line 46 is engaged to the gutter 34 in order to be able to slide. Between the right side of the turning bezel in FIG. 5 and the body 201, an O-ring 47 is built in. The O-ring 47 prevents water and light from entering the inner part of the watch-type information processing apparatus 200.

As shown in FIG. 4, holes 31a and 31b are formed on the body 201. In the holes 31a and 31b, a first sensor unit 32 and a second sensor unit 33 are placed respectively. In this case, the first sensor unit 32 and the second sensor unit 33 are placed so that the angle between the line from the rotation center O of the turning bezel 202 to the first sensor unit 32 and the line from the rotation center O of the turning bezel 202 to the second sensor unit 33 becomes θ1. Details of the angle θ1 will be described later.

The first sensor unit 32 is placed under (far side of the drawing sheet of FIG. 4) a character indicated by the indicator mark 209 (in FIG. 4, the character is "A").

As shown in FIG. 5, on the undersurface of the turning bezel 202, optical pattern 41 is formed in a location that corresponds to character on the turning bezel 202. Below the surface where the optical pattern 41 is formed, a sensor cover glass 42 is attached to the body 201. Between the body 201 and the sensor cover glass 42, a packing 43 is put in. By this, it is possible to prevent water and other stuff from entering below the sensor cover glass 42.

Below the sensor cover glass 42, the first sensor unit 32 is placed. The first sensor unit 32 comprises an light emitting diode (LED) 44, a photodiode 45, a light blocking plate 44a which is placed between the LED 44 and the photodiode 45, and a base plate 48. The LED 44 emits a first detection light L1 to the optical pattern 41. The photodiode 45 receives reflected light. Based on the received first detection light L1, the first sensor unit 32 generates a first detection signal A.

The second sensor unit 33 comprises an LED, and a photodiode, a light blocking plate, and a base plate, those components being similar to those of the first sensor unit 32. The LED emits a second detection light L2 to the optical pattern 41. The photodiode receives reflected light. Based on the received second detection light L2, the second sensor unit 33 generates a second detection signal B.

Below the base plate 48 of the first sensor unit 32, a contact spring 49 is built. The contact spring 49 electrically connects the first sensor unit 32 and the second sensor unit 33 to a CPU of the watch-type information processing apparatus 200. Instead of the contact spring 49, lead wires may be used.

Figure 14:
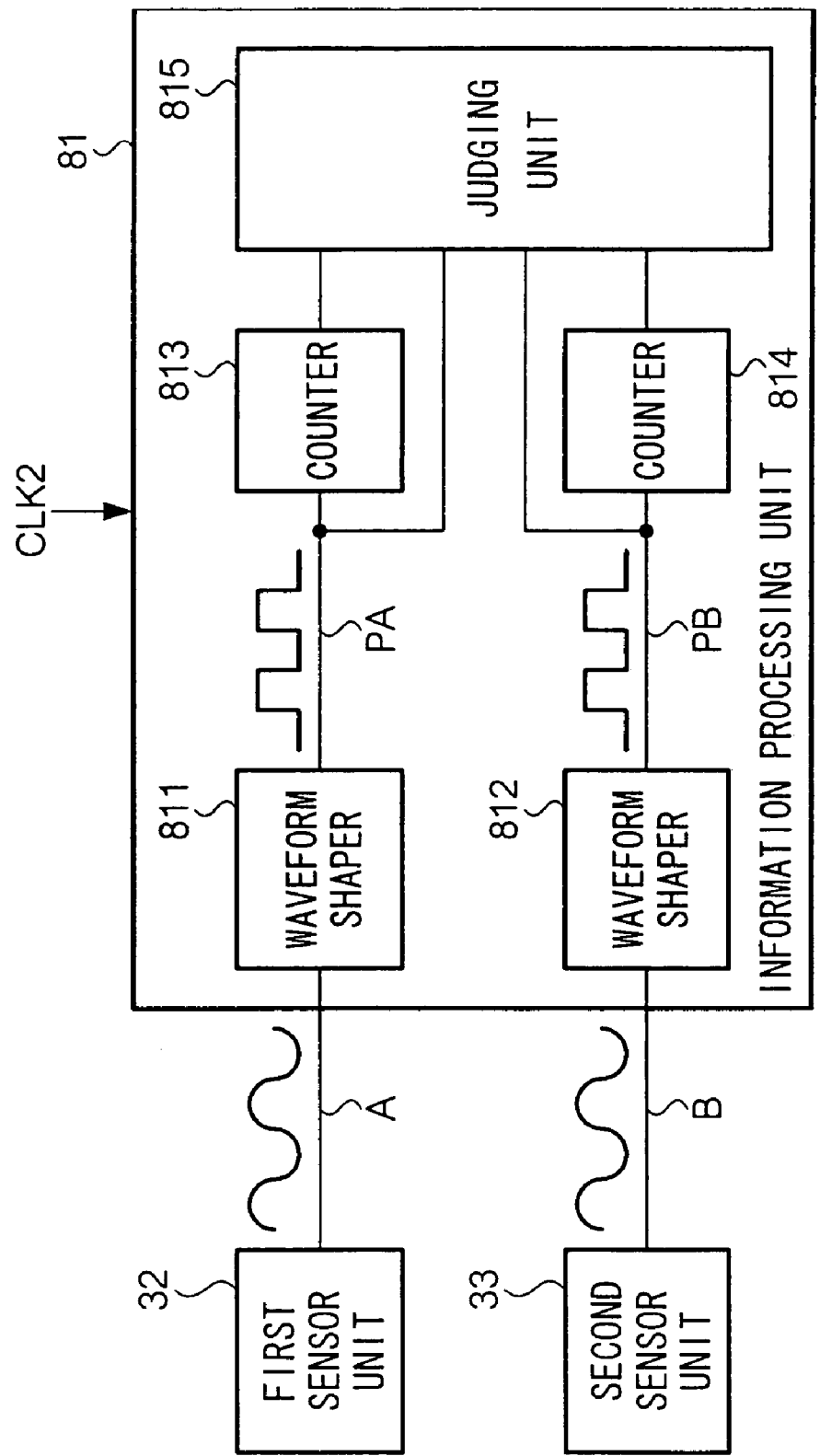
FIG. 14 is a detailed configuration block diagram of the input information-processing unit in the information processing apparatus.

In this way, the first detection signal and the second detection signal B are counted by an information processing unit 81 shown in FIG. 14 (which is later described). By this, rotation angle and rotation direction of the turning bezel 202 is determined.

[1.1.2] About Optical Pattern

Figure 6:
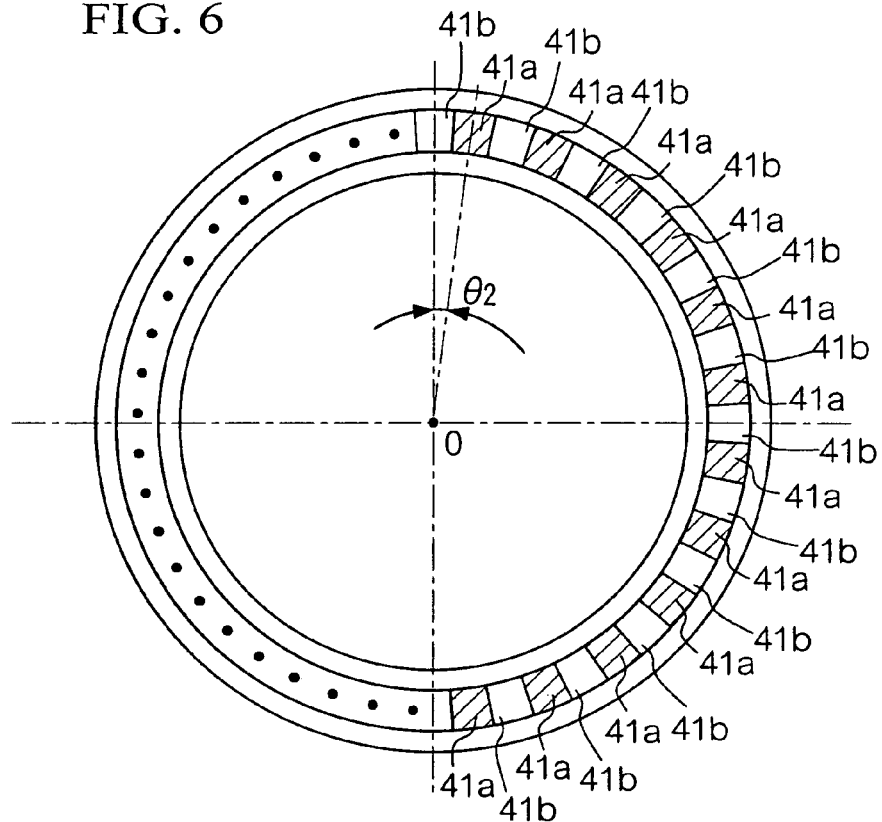
FIG. 6 is a diagram that shows the underside of the turning bezel.

Next, the optical pattern 41 will be described. FIG. 6 is a diagram that shows the underside of the turning bezel 202, the underside functions as a reflective member. As shown in FIG. 6, on the underside of the turning bezel 202, the optical pattern 41 is formed along the circle line, the optical pattern 41 having an alternately repetitive pattern of an absorption region 41a that absorbs light emitted by the LED 44 and a reflection region 41b that reflects light emitted by the LED. In this case, a line segment that is from the rotation center O to the middle of either an absorption region 41a or a reflection region 41b makes an angle of θ2 with a line segment that is from the middle of either a neighboring reflection region 41b or a neighboring absorption region 41a to the rotation center O.

In this case, if the number of characters formed on the turning bezel 202 is n (n is an even number), θ2=360/n (°).

Figure 7A:
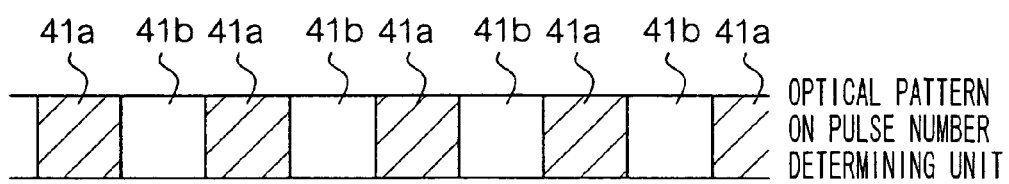
FIGS. 7A and 7B are diagrams that explain a relation between an optical pattern made on the turning bezel and a first detection signal or a second detection signal.
Figure 7B:
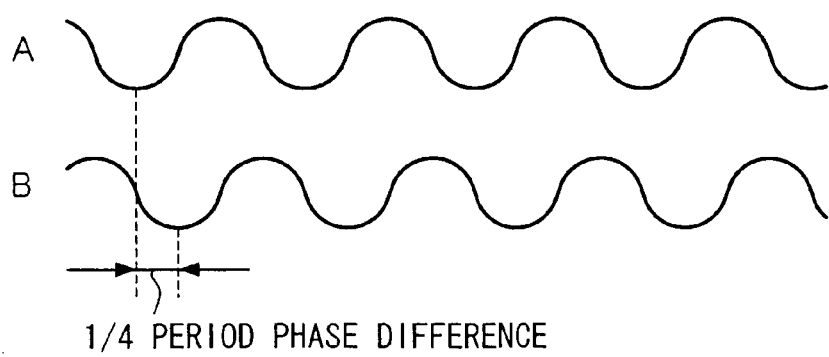

The first sensor unit 32, when a user turns the turning bezel 202, alternately reads the absorption region 41a and the reflection region 41b of the optical pattern shown in the part (A) of FIG. 7, thereby is able to generate the first detection signal A which has approximate sinewave form as shown in the part (B) of FIG. 7.

In the same way, the second sensor unit 33 generates the second detection signal B which has approximate sinewave form shown in the part (B) of FIG. 7.

In the above case, the absorption region 41$a$, the reflection region 41$b$, the first sensor unit 32, and the second sensor unit 33 are placed so that the phase difference becomes a quarter of the wavelength as described later.

[1.1.3] Arrangement of Sensor Unit

Next, the angle θ2 between the first sensor unit 32 and the second sensor unit 33 will be described.

In this embodiment, the first sensor unit 32 and the second sensor unit 33 are placed so that the angle θ1 equals θ2 plus θ2/2. By this, when a user turns the turning bezel 202, a phase difference of a quarter of the wave length is produced between the first detection signal A generated by the first sensor unit 32 and the second detection signal B generated by the second sensor unit 33.

As shown in FIG. 7, when a user turns the turning bezel 202 in a clockwise direction, the second detection signal has an advanced phase of one quarter of the wavelength to the first detection signal. On the other hand, when a user turns the turning bezel 202 in a counterclockwise direction, the second detection signal has a phase delay of one quarter of the wavelength to the first detection signal. By detecting these phase advance and delay, it becomes possible to determine direction of rotation of the turning bezel 202 as described later.

[1.1.4] Schematic Configuration

Figure 8:
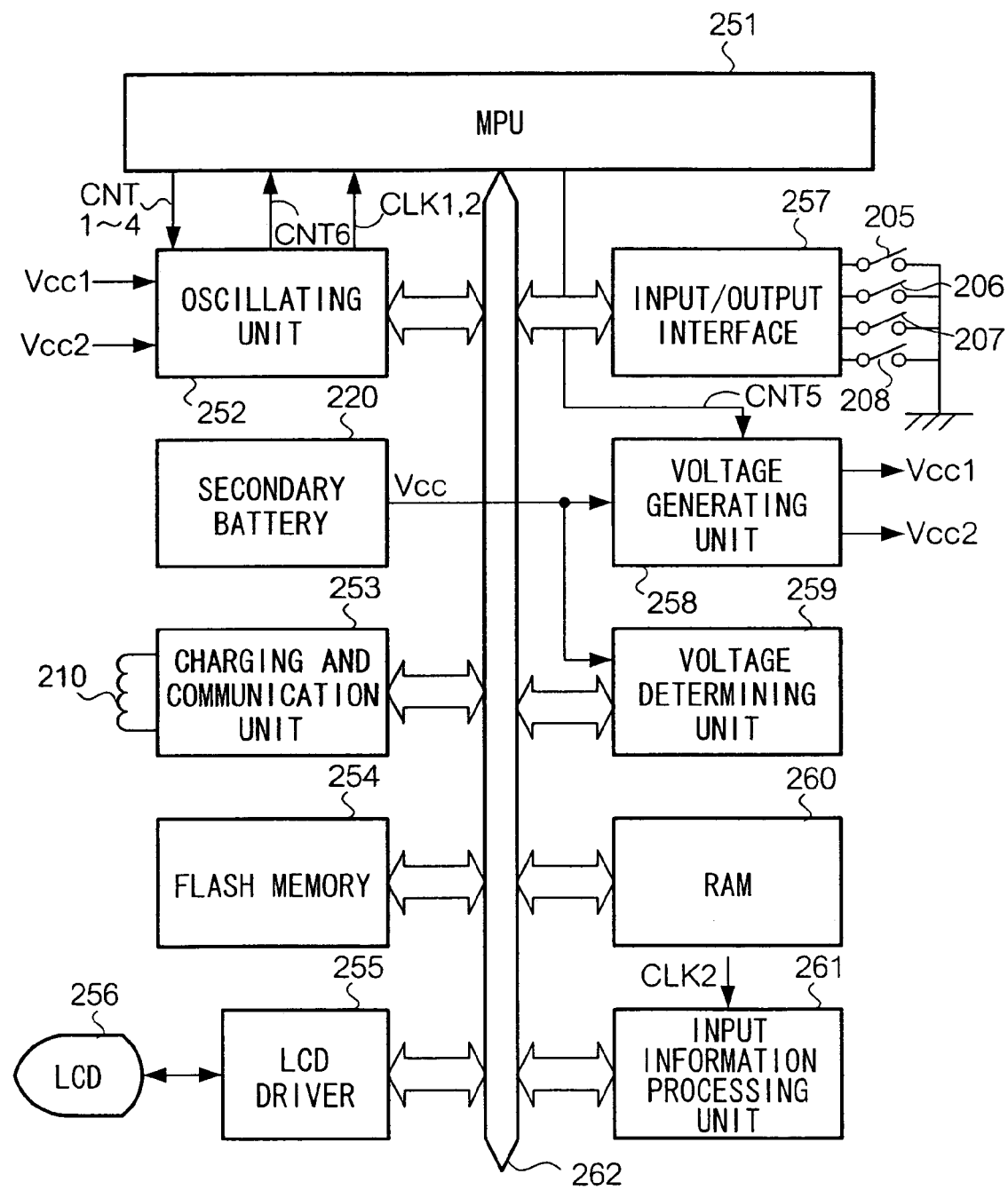
FIG. 8 is a schematic configuration block diagram of the watch-type information processing apparatus.

Next, with reference to FIG. 8, schematic configuration of the watch-type information processing apparatus 200 will be described. On the circuit board 221 shown in FIG. 2, a micro-processing unit (MPU) 251, an oscillating unit 252, a charging and communication unit 253, a flash memory 254, an LCD driver 255, an LCD 256, an input output interface unit 257, a voltage generating unit 258, a voltage determining unit 259, a RAM 260, an input information processing unit 261 are placed, and a bus 262 is formed to connect the above components. The output voltage of the secondary battery 220 is provided to the voltage generator 258 and the voltage determining unit 259.

The micro-processing unit 251 controls the entire watch-type information processing apparatus 200. When performing this control, the micro processing unit 251 outputs control signals CNT1, CNT2, CNT3, and CNT4 to the oscillating unit 252.

The oscillating unit 252, based on the control signals CNT1 to CNT4, generates and outputs clock signals CLK11 and CLK12.

The charging and communication unit 253 is provided with electric power from the station 100 via the watch-side coil 210, and provides a charging current to the secondary battery 220. The charging and communication unit 253 also performs data transmission and reception with the station 100 via the watch-side coil 210.

The secondary battery 220 stores the charging current provided by the charging and communication unit 253. The battery voltage is provided to various units as power supply voltage for operation.

The flash memory 254 is a non-volatile memory that stores displaying pattern data items for displaying various characters, and functions as a character generator.

The LCD driver 255, under controls of the micro-processing unit 251, displays various data items on the display 256.

The input output interface unit 257 determines operating conditions of the confirmation switch 205, the delete switch 206, the sonant mark switch 207, and the starting point switch 208, and performs interface operation between the switches and the micro-processing unit 251.

The voltage generating unit 258 receives the power supply voltage VCC from the secondary battery 220 and provides power supply voltage VCC1 for a quartz crystal oscillating circuit and system power supply voltage VCC2.

The voltage determining unit 259 determines voltage of the power supply voltage VCC of the secondary battery.

The RAM 260 temporarily stores various data items.

The input information-processing unit 261 receives data items input with operation of the bezel 202 and performs data input processing. The data input processing is to provide the input data items to the MPU 251.

Next, explanations will be given of detailed configurations of the oscillating unit 252, the voltage generating unit 258, and the input information-processing unit 261.

Figure 9:
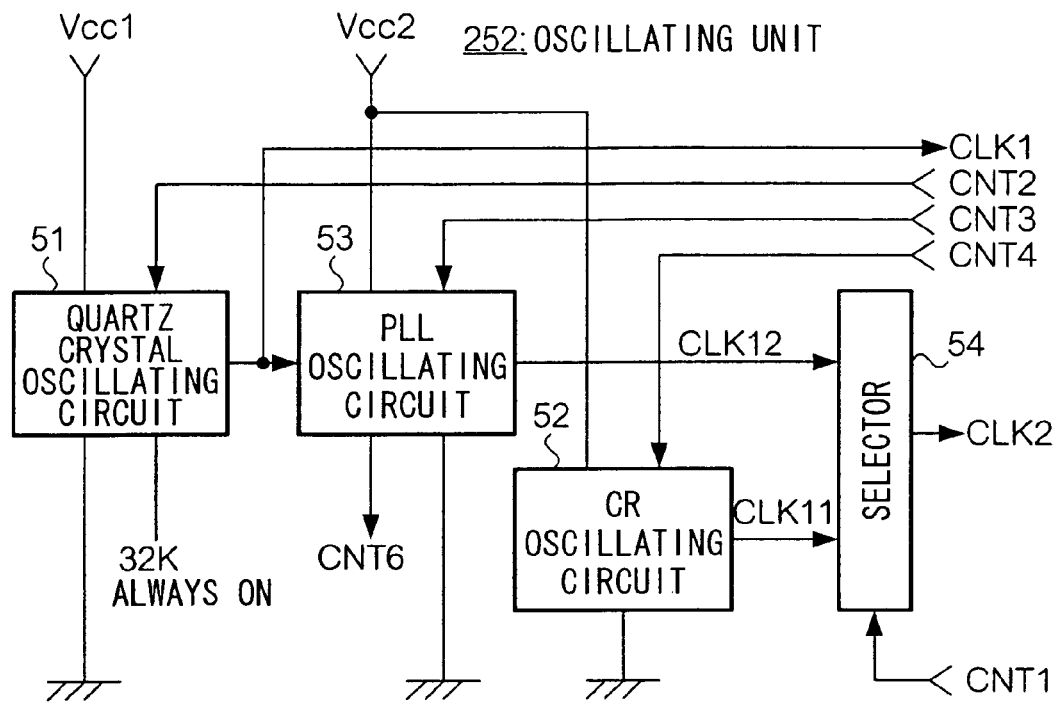
FIG. 9 is a detailed configuration block diagram of the oscillator unit in the information processing apparatus.

FIG. 9 is a detailed configuration block diagram of the oscillating unit. The oscillating unit 252 comprises a quartz crystal oscillating circuit 51, a CR oscillating circuit 52, a PLL oscillating circuit 53, and a selector 54.

The quartz crystal oscillating circuit 51 is a low-speed oscillating circuit and, by receiving the control signal CNT2 and power supply voltage VCC1 for the quartz crystal oscillating circuit, outputs a clock signal CLK1 having low frequency (for example 32 kHz) for time keeping.

The CR oscillating circuit 52 is a first high-speed oscillating circuit, based on the control signal CNT3, outputs a clock signal CLK11 having high frequency (for example from 1 MHz to 8 MHz) for information processing.

The PLL oscillating circuit 53 is a second high-speed oscillating circuit, based on the control signal CNT4, outputs a clock signal CLK12 having high frequency (for example from 4 MHz to 16 MHz) for information processing.

The selector 54, based on the control signal CNT1 from the information processing unit 81 (which is described later), selects either the CR oscillating circuit 52 or the PLL oscillating circuit 53 and outputs the output signal of the selected circuit as a clock signal CLK2.

In the above case, the clock signal CLK1 from the quartz crystal oscillating circuit 51 is used for time keeping, and the clock signal CLK2 is used for information processing by the information processing unit 81 (which is described later).

Here, explanation will be given of the configurations of the quartz crystal oscillating circuit 51, the CR oscillating circuit 52, and the PLL oscillating circuit 53.

Figure 10:
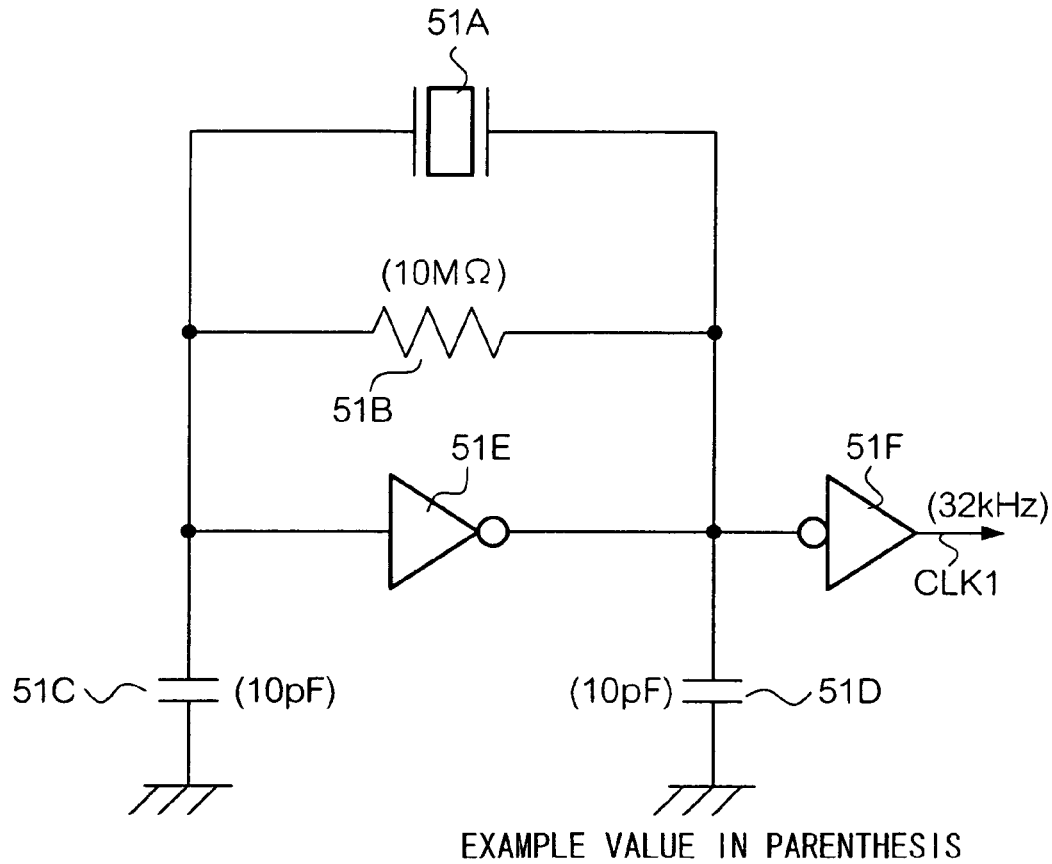
FIG. 10 is a detailed configuration diagram of the crystal quartz oscillating circuit in the oscillator unit.

The configuration of the quartz crystal oscillating circuit 51 is shown in FIG. 10. The quartz crystal oscillating circuit 51 comprises a first inverter circuit 51E. Between the input terminal and the output terminal of the inverter circuit 51 are connected a quartz oscillator 51A and a resistor 51B in parallel with the first inverter circuit 51E. The quartz oscillator 51A has an oscillating frequency of 32 kHz. The input terminal of the first inverter circuit 51E is connected to the lower voltage side power source (GND) via a capacitor 51C. The output terminal of the first inverter circuit 51E is connected to the lower voltage side power source (GND) via a capacitor 51D. A second inverter circuit 51F amplifies the output signal of the first inverter circuit 51E and outputs the clock signal CLK1 having a frequency of 32 kHz.

Figure 11:
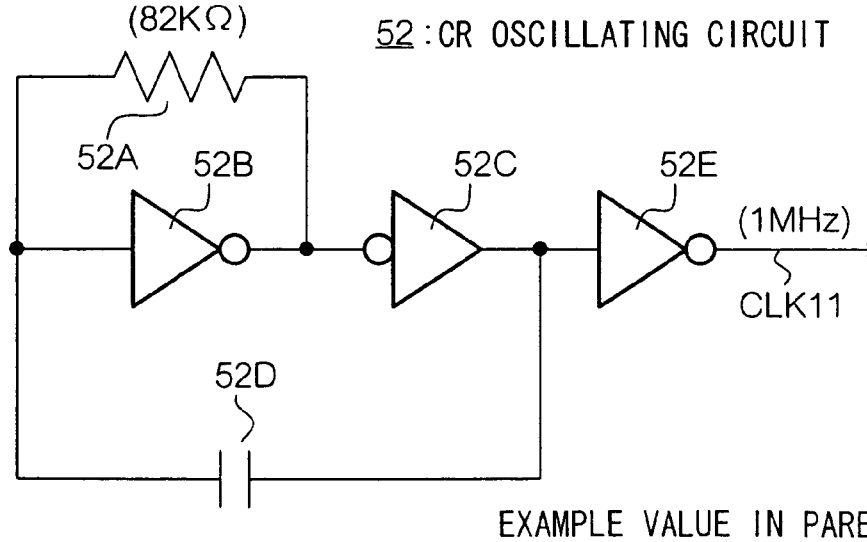
FIG. 11 is a detailed configuration diagram of the CR oscillating circuit in the oscillator unit.

The CR oscillating circuit 52 is shown in FIG. 11. The CR oscillating circuit 52 comprises a first inverter circuit 52B, a second inverter circuit 52C, and a third inverter circuit 52E which are connected in cascade. Between the input terminal and the output terminal of the inverter 52B, a feedback resistor 52A is connected. Between the input terminal of the inverter 52B and the output terminal of the inverter 52C, a capacitor 52D is connected. The third inverter circuit 52E receives the oscillating signal from the second inverter circuit 52C, amplifies it, and outputs it as clock signal CLK11.

Figure 12:
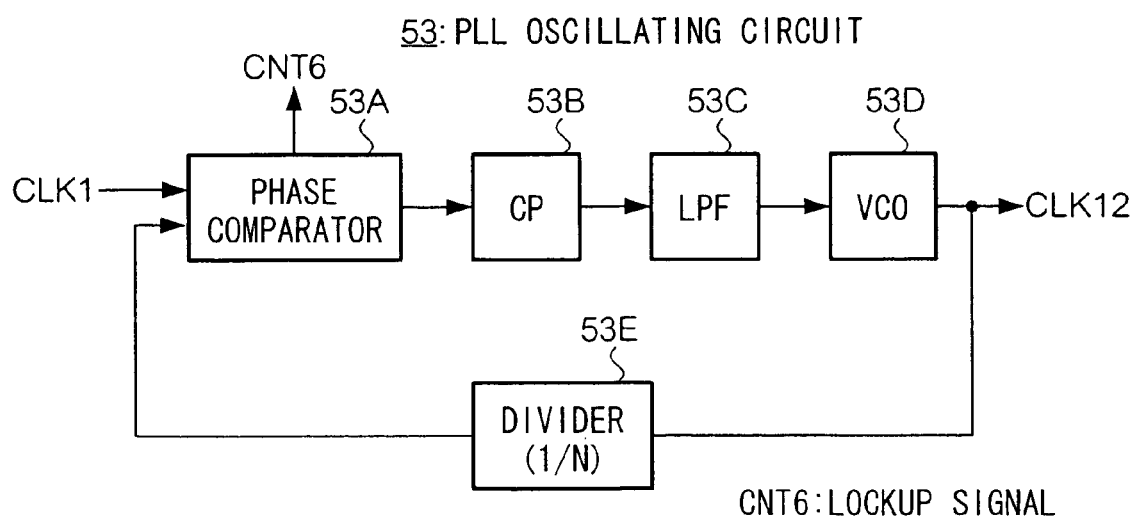
FIG. 12 is a detailed configuration diagram of the PLL oscillating circuit in the oscillator unit.

The PLL oscillating circuit 53 is shown in FIG. 12. The PLL oscillating circuit 53 has a looping formation circuit which is formed by a phase comparator 53A, a charge pump 53B, a low pass filter (LPF) 53C, a voltage controlled oscillator (VCO) 53D, and a divider 53E. The phase comparator 53A compares a phase of the clock signal CLK1 and a phase of the output signal of the divider 53E, and outputs an output signal corresponding to phase difference between them. The charge pump 53B introduces a current into the LPF 53C in response to the output signal of the phase comparator 53A. The LPF 53C selects only lower frequency component of the output signal of the charge pump 53B, and outputs it as a voltage control signal. The VCO 53D oscillates in a frequency corresponding to the voltage control signal output from the LPF 53C, and outputs the clock signal CLK12. The divider 53E divides the frequency of the clock signal CLK12 into an Nth of its frequency.

In the above configuration, when there is a phase difference between the incoming clock signal CLK1 and the output signal of the divider 53E, synchronization establishment is carried so as to reduce the phase difference and make the output signal of the divider 53E phase-locked with the clock signal CLK1. When the synchronization is established and a state of the PLL oscillating circuit reaches a synchronization maintained state where the output signal of the divider 53E is kept to be in phase-locked with the clock CLK1, the phase comparator 53A outputs a lock-up signal CNT6 having the "H" level indicating the above information.

Here, advantages and disadvantages of CR oscillating circuits and PLL oscillating circuits will be explained.

CR oscillating circuits require about four time more power consumption than PLL oscillating circuits do, but the waiting time for constant oscillation of CR oscillating circuits is shorter than that of PLL oscillating circuits. For example, the waiting time for constant oscillation of CR oscillating circuits is about 5 msec. CR oscillating circuits, when used under its upper limited frequency of 1 MHz, is operable at a voltage that is lower than a lower limited voltage for the operation of PLL oscillating circuits (for example until as low as 1.5 V). Hereinafter, for the sake of convenience, a waiting time for constant oscillation of CR oscillating circuits is referred to as a first oscillation stability time, and a lowest limited operating voltage as a first lowest operating voltage.

On the other hand, PLL oscillating circuits are able to oscillate until at a considerably high frequency with low power consumption. However, PLL oscillating circuits have long waiting time for constant oscillation (for example 50 msec), and its lowest operating limited voltage is high (for example 2 V). Hereinafter, for the sake of convenience, a waiting time for constant oscillation of PLL oscillating circuits is referred to as a second oscillation stability time, and a lowest limited operating voltage as a second lowest operating voltage.

Therefore, CR oscillating circuits and PLL oscillating circuits have their merits and demerits. In this embodiment, by combining advantages of each oscillating circuits, a high-speed oscillating circuit with low power consumption, low operating voltage, and short waiting time for constant oscillation is achieved.

The voltage generating unit 258, as shown in FIG. 13, comprises a first constant voltage circuit 258A and a second constant voltage circuit 258B. The first constant voltage circuit 258A generates power supply voltage VCC1 for the quartz crystal oscillating circuit from the power supply voltage VCC. The second constant voltage circuit 258B is controlled by the control signal CNT5 and generates the system power supply voltage VCC2 from the power supply voltage VCC.

Next, with reference to FIG. 14, detail of the input information-processing unit 261 will be described. The input information processing unit 261 comprises the information processing unit 81 which has a counter 813 for counting the number of pulses of the first detection signal A from the first sensor unit 32 and a counter 814 for counting the number of pulses of the second detection signal B from the second sensor unit 33. The first detection signal A and the second detection signal B are changed into detection pulse signals PA and PB by waveform shapers 811 and 812 respectively. These pulses are input to the counters 813 and 814. The input information-processing unit 261 also comprises a judging unit 815 for determining direction of rotational and location of the turning bezel 202 based on the counted values of the counters 813 and 814 and detection pulse signals PA and PB. In this case, the judging unit 815 judges direction of rotation based on, for example, level ("H" or "L") of the detection pulse signal PB at positive edge of the detection pulse signal PA.

The input information processing unit 261, based on the first detection signal A generated by the first sensor unit 32 and the second detection signal B generated by the second sensor unit 33, generates information data and stores the information data confirmed by a user into the RAM 260.

In the above case, the information-processing unit 81, by referring to information table on the flash memory 254 generates an information signal. The flash memory 254 stores conversion tables: one of the conversion table is used for converting the output data of the judging unit 815 into a code of character designated by the turning bezel, and one other conversion tables is used for converting the output of the judging unit 815 into a code of image data of the character designated by the turning bezel 202. The flash memory also stores information items corresponding to a location of the turning bezel 202, Based on the information signal, and by using the character generator in the flash memory 254, the LCD driver 255 displays characters and other information on the LCD 256.

In addition, the information processing unit 81 can process following processing.

For example, document files made on other personal computer may be transmitted to the apparatus via the charging and communication unit 253 and the station 100, then displayed on the LCD 256.

When a simple operating system (OS) is installed in the information processing unit 81, simple application programs can be made for the OS. Creatable application programs are for example schedule managing program and address data managing program. Further, importing and exporting data such as scheduling data and address data from other personal computer can be possible. Data processing such as data addition, data deletion, or data sorting can be possible.

Next, roles of the starting point switch 208, the confirmation switch 205, the delete switch 206, and the sonant mark switch 207 will be described.

The starting point switch 208 is a switch that changes the watch-type information processing apparatus into a state of an information input. When the switch 208 is turned on, the counter for the number of pulses in the unit 81 is reset to "0" and the judging unit 815 starts measuring rotation angle and direction of the turning bezel 202 using the first sensor unit 32 and the second sensor unit 33.

The confirmation switch 205 and the delete switch 206 are used for confirmation and deletion of the information items generated by the information-processing unit 82.

The sonant mark switch 207 is used for adding a sonant mark when the generated information item by the information-processing unit 81 is a Japanese syllabary and requires a sonant mark. When the generated character is an alphabetic character, the switch 207 is used for switching the character between a capital letter and a small letter.

The information items generated by the information-processing unit 81 are not limited to character. Instruction codes for such as line feed and mode switching (for example, between time display mode and character input mode) may also be generated by the information processing unit 81. In this case, the information table on the flash memory 254 stores instruction codes for such as line feed and mode switching with correspondence with location of the turning bezel 202. Based on location of the turning bezel 202, the information-processing unit 81 generates instruction codes.

[1.2] Operation of the Information Processing Unit and the Oscillating Circuit

Figure 15:
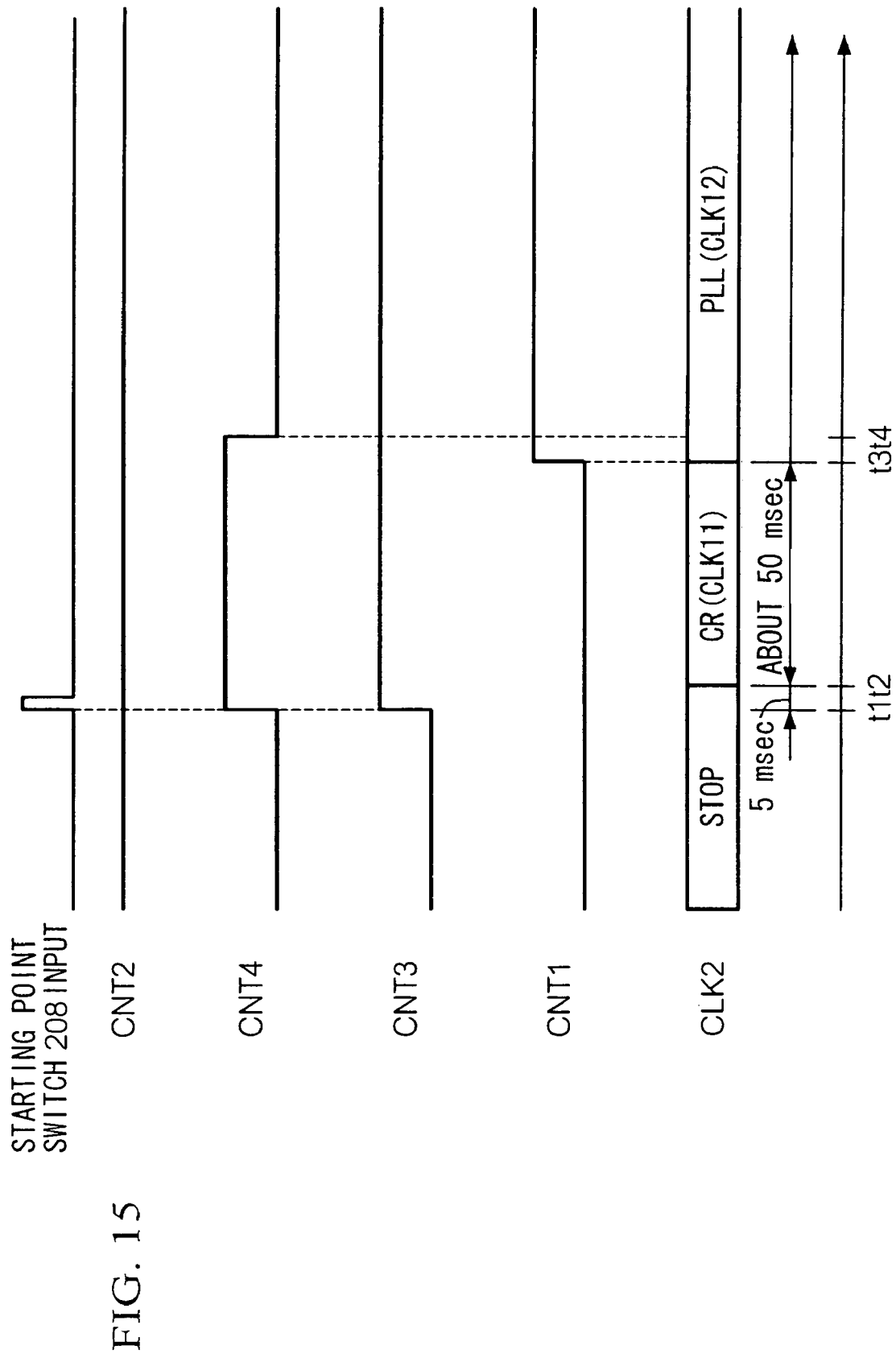
FIG. 15 is a processing timing chart showing time keeping operation and switching operation of the information processing apparatus.

Here, by paying an attention to operations of the information-processing unit 81 and the oscillating circuits 51, 51, and 53, an explanation will be given. FIG. 15 is a processing timing chart during time keeping operation and switching operation to information processing.

[1.2.1] Operation During Time Keeping

In an initial state, the control signal CNT2 output from the micro-processing unit 251 has the "H" level. The quartz crystal oscillating circuit 51 is in an operating state and outputs the clock signal CLK1 to the information-processing unit 81. The control signal CNT1 has the "L" level. Thereby, the selector 54 selects the CR oscillating circuit 52.

By this, the information-processing unit 81, based on the clock signal CLK1, performs time keeping operation and displays time on the display unit 104.

While the information processing unit 81 displays time, the control signals CNT3 and CNT4 have the "L" level, and the CR oscillating circuit 52 and the PLL oscillating circuit 53 are in an inoperative state or a standby state.

[1.2.2] Shift to the Information Processing Operation

At time t1 in FIG. 15, the starting point switch 208 is used and a starting point signal becomes the "H" level. By this, the information-processing unit 81 is switched from time keeping operation to information processing operation.

By this, the micro processing unit 251 makes the control signals CNT3 and CNT4 to the "H" level so that the CR oscillating circuit 52 and the PLL oscillating circuit 53 start oscillating. In this case, an early stage oscillation stabilization frequency of the CR oscillating circuit 52 is about 1 MHz, and an early stage oscillation stabilization frequency of the PLL oscillating circuit 53 is about 4 MHz.

By this, the state of the CR oscillating circuit 52 gradually shifts to an oscillation stable state. In the above case, at time t2 which is 5 msec after beginning of oscillation, the CR oscillating circuit 52 is in an oscillation stable state. The information-processing unit 81 starts its operation using the clock signal CLK12 as the clock signal CLK2.

On the other hand, at time t2 (a first oscillation stability time elapsed point: 5 msec elapsed point), the PLL oscillating circuit 53 is in an oscillation non-stable state.

Subsequently, oscillation frequency of the CR oscillating circuit 52 gradually increases, resulting in around 4 MHz.

At time t3 (a second oscillation stability time elapsed point) where 50 msec has elapsed since the time t2, the PLL oscillating circuit 53 also enters an oscillation stable state, where oscillation frequency is also around 4 MHz.

Therefore, the micro-processing unit 251 makes the control signal to the "H" level and changes the selection of the selector 54 to the PLL oscillating circuit 53.

After this, the information-processing unit 81 operates using the clock signal CLK12 as the clock CLK2.

Further, at time t4, the micro-processing unit 251 makes the control signal CNT4 to the "L" level and stops oscillation of the CR circuit 52.

Subsequently, the micro-processing unit 251 gradually raises oscillation frequency of the PLL oscillating circuit 53. By this, the watch-type information apparatus works at a desired high-speed frequency (for example 12 MHz, but in this embodiment 16 MHz).

[1.2.3] Operation During Declining of the Power Supply Voltage

Figure 16:
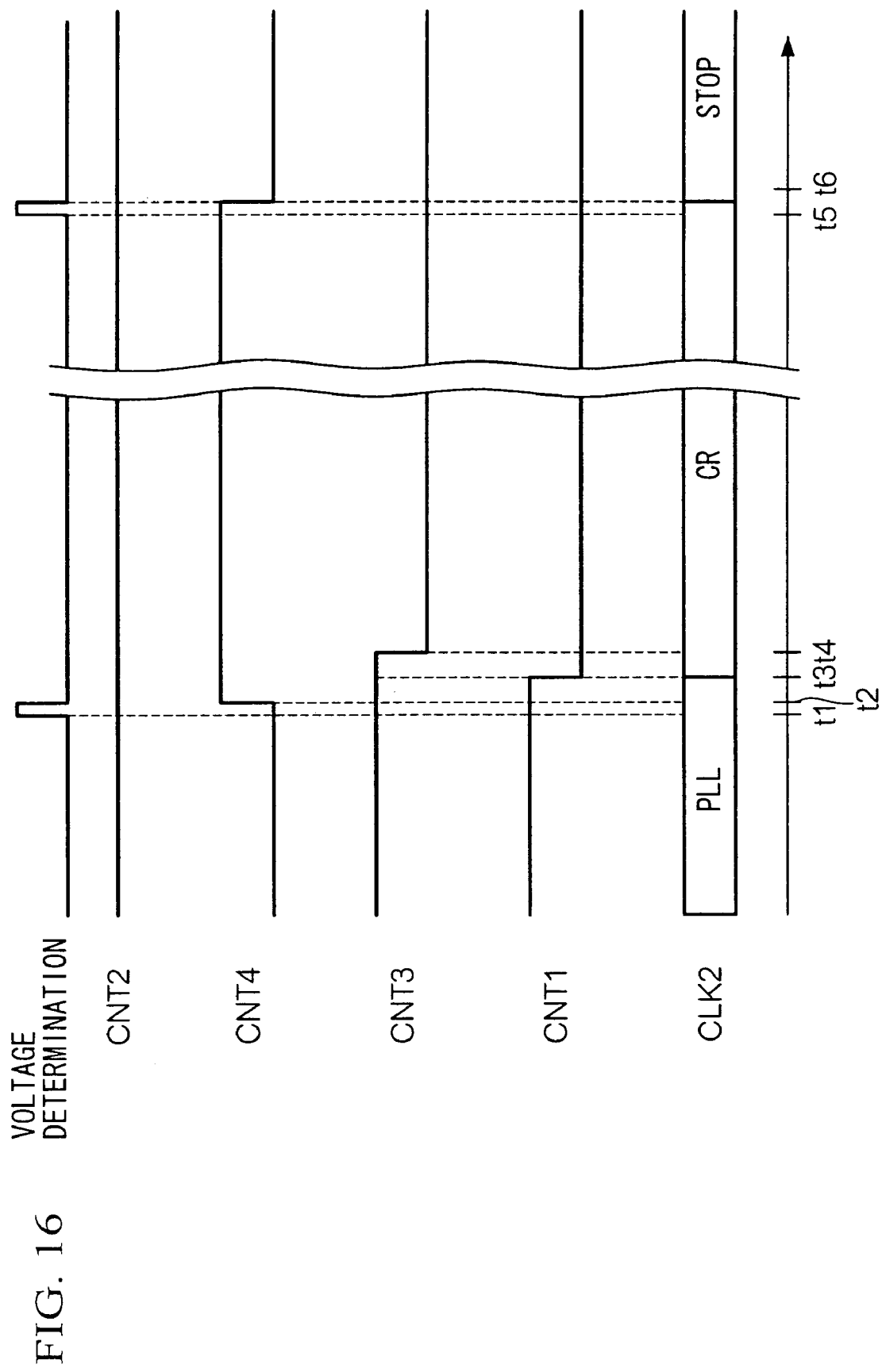
FIG. 16 is a processing timing chart showing operation of the information processing apparatus when power supply voltage declines.

FIG. 16 is a processing timing chart when power supply voltage declines. The information-processing unit 81, in a case where information processing is performed in a steady state, uses the clock signal CLK12 which corresponds to oscillation frequency of the PLL oscillating circuit 53 as the clock signal CLK2 as mentioned above.

However, there can be a case where the declining of the power supply voltage stops the operation of the PLL oscillating circuit 53. That is, when the power supply voltage becomes lower than the second lowest operating voltage, the PLL oscillating circuit 53 cannot operate properly.

Therefore, the MPU 251, based on the result of the voltage determining unit 259, when the power supply voltage declines to a voltage which is higher or equal to the first lowest operating voltage and lower than the second lowest operating voltage, selects the CR oscillating circuit 52. When the power supply voltage further declines to lower than the first lowest operating voltage, the information-processing unit 81 is stopped.

It is assumed that, in this case, the voltage determining unit 259 determines voltage, for example, every hour on the hour.

To be concrete, at time t1 in FIG. 16, the voltage determining unit 259 determines voltage of the secondary battery 220. When the voltage reaches a prescribed switching voltage (for example, in the above case, about 2.2 V), the micro-processing unit 251 starts the CR oscillating circuit 52 by making the control signal CNT4 to the "H" level at time t2.

The micro-processing unit 251 gradually lowers oscillation frequency of the PLL oscillating circuit 53 to around 4 MHz.

At time t3, oscillation frequency of the CR oscillating circuit 52 has already reached 4 MHz. Therefore, the micro-processing unit 251 makes the control signal CNT1 to the "L" level and changes the selection of the selector 54 to the CR oscillating circuit 52.

Therefore, after this, the information-processing unit 81 operates using the clock signal CLK11 as the clock CLK2. It becomes possible to perform information processing operation until power supply voltage declines to around 1.5 V which is the lowest operating voltage of the CR oscillating circuit 52.

Further, at time t4, the micro-processing unit 251 makes the control signal CNT3 to the "L" level and stops oscillation of the PLL circuit 53.

Subsequently, the voltage determining unit 259 measures voltage of the secondary battery 220. When the voltage of the secondary battery 220 reaches around 1.5 V which is the lowest operating voltage of the CR oscillating circuit 52, the micro-processing unit 251 notifies this to the user. By this, the micro processing unit 251 urges the user to charge secondary battery or change battery.

Further, at time t5 when the voltage determining unit 259 measures voltage of the secondary battery 220, if power supply voltage is lower than 1.5 V, the MPU 251 makes the control signal CNT4 to the "L" level and stops oscillation of the CR oscillating circuit 52 at time t6.

As a result, the information processing unit 81 stops information processing operation and continues to performs time keeping operation until power supply voltage becomes the lowest operating voltage of the quartz crystal oscillating circuit 51 of around 1 V.

[1.3] Effect of the First Embodiment

As described above, according to the first embodiment of the present invention, by using CR oscillating circuit and PLL oscillating circuit selectively, it becomes possible to provide a low power-consumption, short waiting-time for stable oscillation, low operating voltage information-processing apparatus.

In addition, so far, when using software which places a significant burden on the overall performance of the operation such as browser, high-speed clock is required in order to use it without frustration. In this embodiment, by using CR oscillating circuit, when battery voltage declines and PLL oscillating circuit becomes unable to operates, although speed of display becomes slow, displaying is not impossible, and even in very low voltage it becomes possible to continue to display.

In addition, it becomes possible to start application software from time keeping operation.

Further, when battery voltage declines considerably, it is possible to operate information-processing unit, thus enabling using application software in a very low battery voltage.

[2] SECOND EMBODIMENT

As described in the explanation for the first embodiment above, PLL oscillating circuit operates at low power consumption even at high frequency, but requires long waiting time for stable oscillation.

In order to avoid this, following measures are used in conventional PLL oscillating circuit.

(1) Using two low pass filters (LPF); when starting to use PLL oscillating circuit LPF with small time constant is used, and when oscillation becomes stable LPF with large time constant is used.

(2) Using two low pass filters (LPF); when one LPF is used, the other LPF is prepared to lock up with other frequency.

(3) When PLL oscillating circuit has a charge pump for analog/digital conversion of the output signal of phase comparator, increasing a control current for charge pump at starting up PLL oscillating circuit.

Measures (1) and (2) cannot make lock-up time to zero, and measure (3) makes device configuration complicated and circuit bigger.

Accordingly, a second embodiment provides shorter lock-up time than the PLL oscillating circuit of the first embodiment does, enabling to shift to higher frequency operation in information processing operation.

In the following explanation, configuration except PLL oscillating circuit is the same as that of the first embodiment, so mainly PLL oscillating circuit will be described.

[2.1] Schematic Configuration of the PLL Oscillating Circuit

Figure 17:
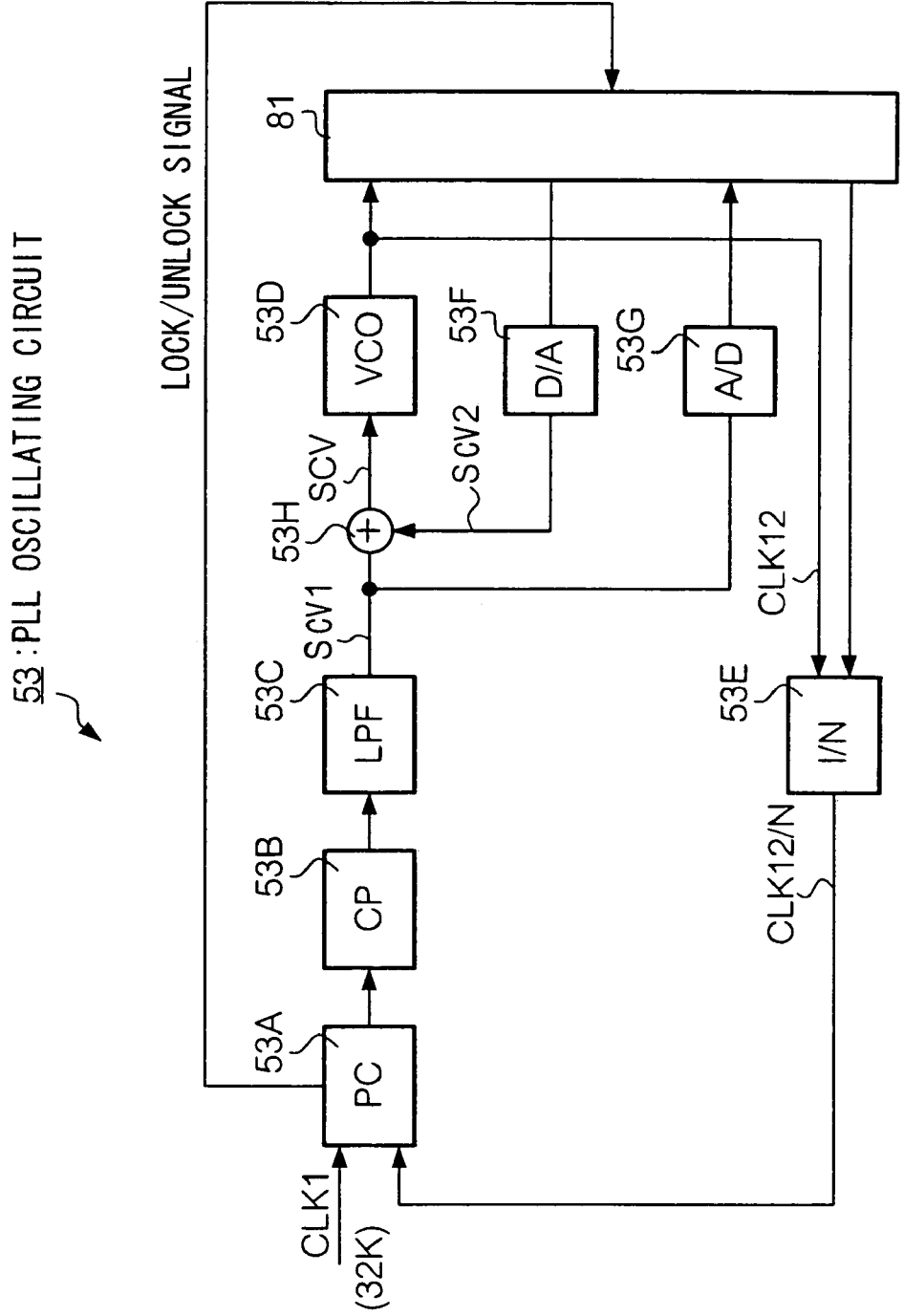
FIG. 17 is a schematic block diagram of a PLL oscillating circuit of the embodiment.

A PLL oscillating circuit 53, as shown in FIG. 17, comprises a phase comparator 53A, a charge pump 53B, an LPF 53C, a voltage controlled oscillator (VCO) 53D, a D/A converter 53F, a divider 53E, an AID converter 53G, and an adder 53H.

The phase comparator 53A compares phase of the clock signal CLK1 and phase of the output signal of the divider 53E and outputs a digital output signal that corresponds to phase difference.

The charge pump 53B, based on the output signal of the phase comparator 53A, outputs a difference voltage that is proportional to the phase difference (frequency difference) of the clock signal CLK1 and a comparison clock signal CLK12/N.

The LPF 53C passes only low frequency component of the output signal of the charge pump 53B and outputs it as a voltage control signal SCV1.

The VCO 53D, based on the voltage control signal SCV output from the adder 53H, controls oscillation frequency of the clock signal CLK12 and outputs it to the divider 53938 E.

The D/A converter 53F converts a digital signal from the information-processing unit 81 into an offset voltage signal SCV2. The adder 53H adds the voltage control signal SCV1 to the clock control signal CLK12 to generates the voltage control signal SCV.

The divider 53E divides frequency of the clock signal CLK12 into an Nth of its frequency and outputs it to the phase comparator 53A as a comparison clock signal CLK12/N.

The A/D converter 53G AID converts the output voltage of the LPF 53C into digital data indicating the output voltage and outputs it to the information-processing unit 81 when the PLL oscillating circuit is locked during examination.

[2.2] Detailed Configuration of the PLL Oscillating Circuit

[2.2.1] Phase Comparator and Charge Pump

Figure 18:
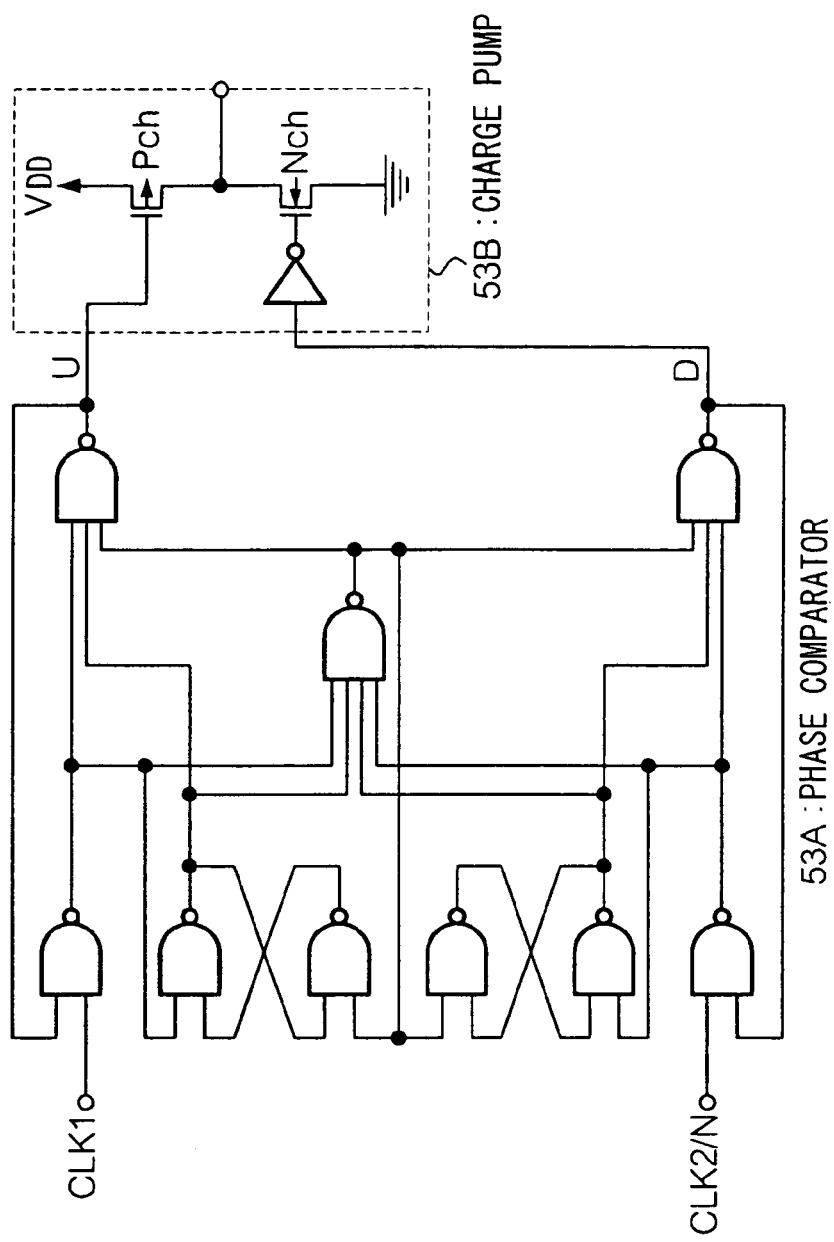
FIG. 18 is a detailed block diagram of a phase comparator and a charge pump that is connected to latter part of the PLL oscillating circuit.

FIG. 18 is a detailed block diagram of a phase comparator and a charge pump that is connected to latter part of the PLL oscillating circuit.

Circuit configurations of the phase comparator 53A and the charge pump 53B will not described in detail since they are widely known. With reference to a timing chart of FIG. 19, operations of these two circuits will be described.

In the timing chart of the FIG. 19, an output signal U becomes the "L" level when the phase of the comparison clock signal CLK12/N is advanced to that of the clock signal CLK1 or when the frequency of the clock signal CLK12/N is higher than that of the clock signal CLK1. The comparison clock signal CLK12/N is a clock signal obtained by frequency dividing of the clock signal CLK12.

The output signal D becomes the "L" level when the phase of the comparison clock signal CLK12/N is delayed to that of the clock signal CLK1 or when the frequency of the clock signal CLK12/N is lower than that of the clock signal CLK1.

When the phase of the comparison clock signal CLK12/N is equals to the phase of the clock signal CLK1 at the rising timing, the both output signals U and D becomes the "H" level. This state corresponds to a so-called locked state of the PLL oscillating circuit 53.

At this state, both a p-channel transistor and an n-channel MOS transistor that comprise the charge pump 53B becomes the OFF state, and the output of the charge pump 53B is put in a high impedance state.

On the other hand, at time t1 and t2 as shown in a timing chart in FIG. 19, in a case where the phase of the comparison clock signal CLK12/N is advanced to the phase of the clock CLK1, or where the frequency of the clock signal CLK12 is higher than that of the clock signal CLK1, the output signal U becomes the "L" level during the time interval between the negative edge of the clock signal CLK12/N and the negative edge of the clock signal CLK1. The time interval is proportional to the phase difference or the frequency difference. At this time, the output signal D remains the "H" level.

In the same way, at time t3 and t4 in FIG. 19, in a case where the phase of the comparison clock signal CLK12/N is delayed to the phase of the clock CLK1, or where the frequency of the clock signal CLK12 is lower than that of the clock signal CLK1, the output signal D becomes the "L" level during a time period corresponding to the phase difference or the frequency difference. At this time, the output signal U remains the "H" level.

When these output signals U and D is output from the phase comparator 53A to the charge pump 53B, a p-channel transistor becomes ON only while the output signal U has the "L" level, and an n-channel MOS transistor becomes ON only while the output signal D has the "L" level.

Therefore, the LPF 53C that is connected to following stage of the charge pump 53B outputs a direct current voltage corresponding to the phase difference (frequency difference) between the clock signal CLK1 and the comparison clock signal CLK12/N (see FIG. 19).

The above description is about CMOS configured phase comparator. However, the above description may be applied to a bipolar configured phase comparator.

[2.2.2] LPF

Figure 20:
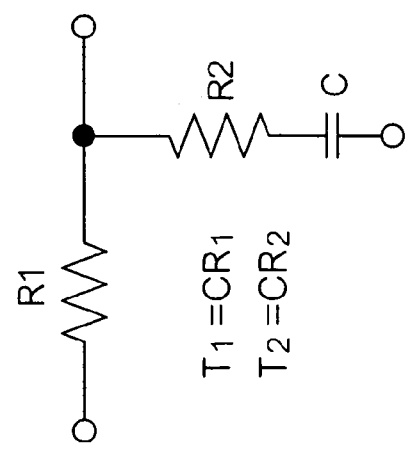
FIG. 20 is an explanatory diagram of the LPF.

FIG. 20 shows a detailed configuration of the LPF, and equations of natural angular frequency and dumping factor of the LPF. The LPF 53C shown in FIG. 20 is a so-called lag-lead filter, so the LPF 53C is a conventional LPF. From a viewpoint of operating speed, the LPF 53C is worse than an active filter with an amplifier, but has enough usefulness when configured in CMOS circuit. When PLL IC is configured with an LPF of CMOS circuit, lockup time can be reduced to around 10 msec.

In the above case, the natural angular frequency on and the dumping factor ζ are shown as follows:

$$\omega n = \sqrt{\{K_p \cdot K_v / (T_1 + T_2) \cdot N\}}$$

$$\zeta = \omega n / 2 \cdot (T_2 + N/K_p \cdot K_v)$$

Variables in the above equations are as follows:
$K_p$: gain constant of the phase comparator (V/rad)
$K_v$: gain constant of the voltage controlled oscillator (rad/sec/V)
N: divisor of the divider

[2.2.3] Voltage Controlled Oscillator

Figure 21:
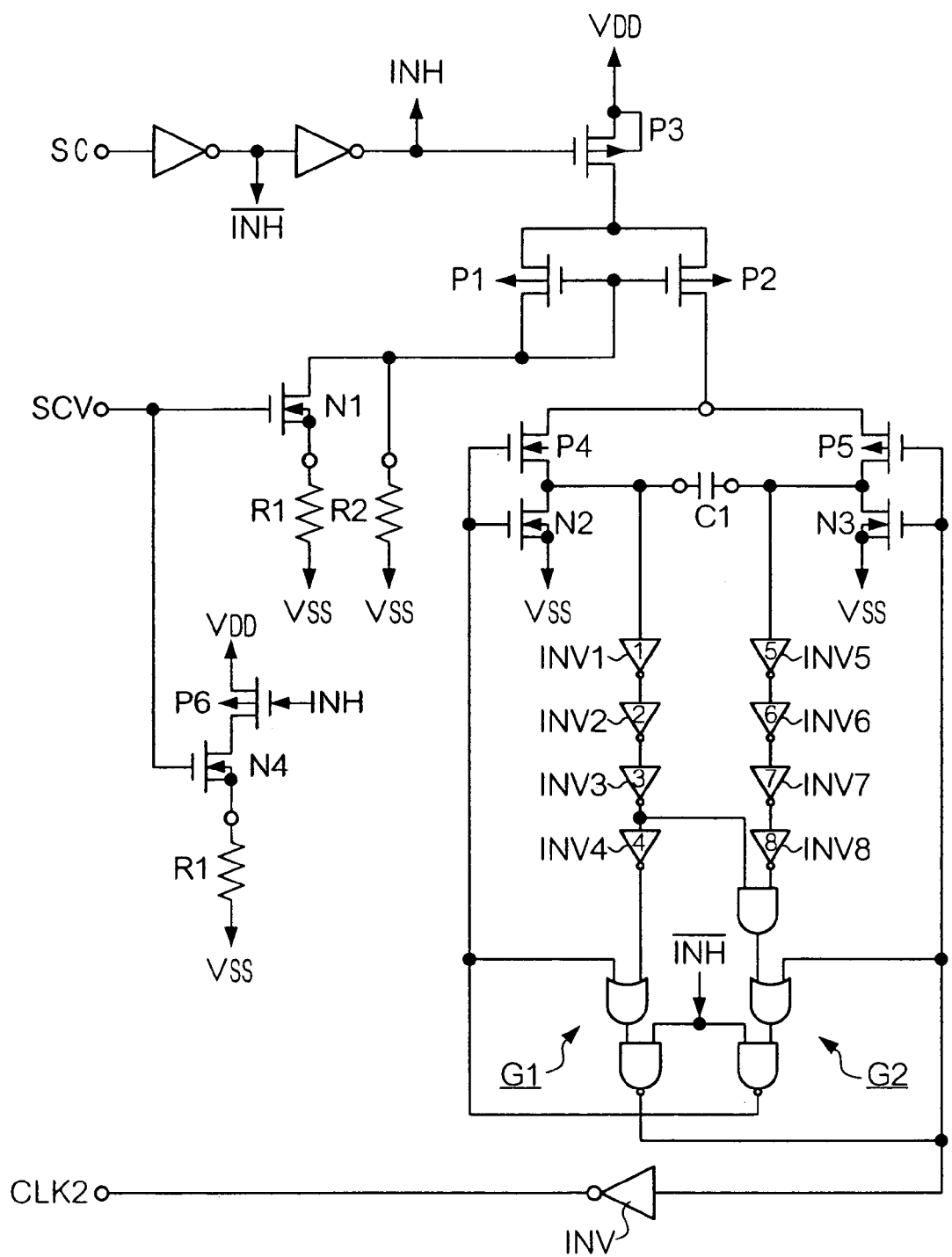
FIG. 21 is a detailed block diagram of the voltage controlled oscillator (VCO).

FIG. 21 shows a detailed configuration of voltage controlled oscillator constructed with CMOS. Since the circuit configuration of the voltage controlled oscillator in FIG. 21 is widely known, explanation of its configuration will be omitted, and only operation will be described.

The voltage controlled oscillator 53D is constructed with CMOS, so input impedance is high and the degree of design freedom of the LPF 53C, the preceding circuit, increases.

In FIG. 21, when the control signal SC has the "H" level, the p-channel transistor P3 becomes OFF, thus enabling to stop oscillation.

When the control signal SC has the "L" level, the voltage controlled oscillator 53D becomes operating state, and since an n-channel transistor N1 is constructed in a source follower configuration, if a resistor R1 has high resistance enough, the drain current of the n-channel transistor N1 changes in linear relation with the voltage control signal SCV.

Therefore, currents of the p-channel MOS transistors P1 and P2 change in the same manner. As a result, drain currents of the p-channel MOS transistors P1 and P2 changes in linear relation with the voltage control signal SCV.

On the other hand, gates G1 and G2 construct a flip-flap circuit, and a p-channel transistor P4, an n-channel transistor N2, a p-channel transistor P5, and an n-channel transistor N3 work as switches.

When the output of the gate G1 has the "L" level, the output if the gate G2 has the "H" level, the p-channel transistor P5 and the n-channel transistor N2 are in ON state, and the p-channel transistor P4 and the n-channel transistor N3 are in OFF state.

Therefore, the input of the inverter INV becomes the lower side power supply voltage VSS, and electrical potential at the input terminal of the inverter INV5 rises because the capacitor C1 is charged by drain current of the p-channel transistors P2 and P5. Further, when output signal levels of the inverter INV5 to INV8 is reversed, outputs of the gate G1 and G2 that comprise a flipflap circuit are reversed.

Next, output of the gate G1 becomes the "H" level, output of the gate G2 becomes the "L" level, the p-channel transistor P5 and the N-channel transistor N2 become to OFF state, and the p-channel transistor P4 and the n-channel transistor N3 become to ON state. Therefore, the capacitor C1 is charged by drain current of the p-channel transistor P2 and P4. Then electrical potential at the input terminal of the inverter INV1 rises. Then, the output level of the inverters INV1 to INV4 is reversed. The same operation repeats after this.

In this case, the charging current of the capacitor C1 can be controlled by voltage of the voltage control signal SCV. Therefore, frequency of the clock signal CLK12 is changeable.

[2.3] Operation of the Information Processing Unit and the Oscillating Circuit

Here, operations of the information-processing unit 81, the CR oscillating circuit 52, and a PLL oscillating circuit 53 will be described.

[2.3.1] Operation During Keeping Time

When the information-processing unit 81 displays time, as mentioned above for the first embodiment, the PLL oscillating circuit 53 is in an inoperative state or a standby state under a control of the micro processing unit 259.

By this, the information-processing unit 81, based on the clock signal CLK1, carries out time keeping operation and displays time on the display unit 204.

[2.3.2] Shift to the Information Processing Operation

When the operation of the information processing unit 81 is switched from time keeping operation to information processing operation, the micro processing unit 259 starts oscillation of the PLL oscillating circuit 53 as in the case of the first embodiment.

In this case, the micro processing unit 259 sets an output voltage data stored in a register (not shown) or a non-volatile memory of flash memory 254 corresponding to an output voltage of the LPF 53C, which output voltage is voltage of during a pre-conducted examination and is voltage when the PLL oscillating circuit 53 is locked.

By this, the D/A converter 53F generates an offset voltage signal SCV2 that corresponds to an output voltage of the LPF 53C at a pre-conducted examination. The offset voltage signal SCV2 is supplied to the VCO 53D via the adder 53H. As a result, the VCO 53D starts oscillation at a frequency which nearly equals to the frequency at which the PLL oscillating circuit 53 is in lock up state.

On the other hand, the phase comparator 53A compares the phase of the clock signal CLK1 and the phase of the output signal the divider 53E and outputs a (digital) output signal corresponding to the phase difference between the above two signals to the charge pump 53B.

The charge pump 53B, based on the output signal of the phase comparator 53A, outputs a difference voltage proportional to the phase difference (frequency difference) between the clock signal CLK1 and the comparison clock signal CLK12/N to the LPF 53C.

The LPF 53C passes lower component of the output signal of the charge pump 53B and outputs it as the voltage control signal SCV1.

As a result, the input terminal of the voltage controlled oscillator (VCO) 53D receives the voltage control signal SCV which is produced by s applying the offset voltage signal SCV2 on the voltage control signal SCV 1, the clock signal CLK12 having a frequency corresponding to the voltage control signal SCV is generated, and the clock signal CLK12 is output to the information processing unit 81 and the divider 53E.

The divider 53E divides the clock signal CLK12 output by the voltage controlled oscillator 53D and outputs the divided signal as the comparison clock signal CLK12/N to the phase comparator 53A. Thus, frequency of the clock signal CLK12 output by the voltage controlled oscillator 53D is locked in a desired frequency.

[2.4] Effect of the Second Embodiment

Figure 22:
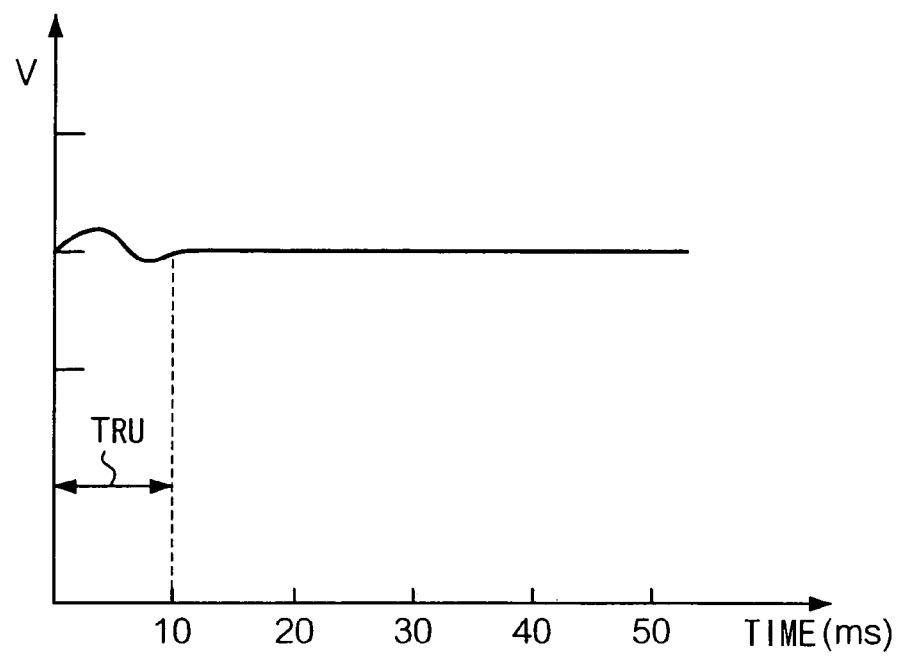
FIG. 22 is an explanatory diagram for the lockup time of the PLL oscillating circuit of the second embodiment.
Figure 23:
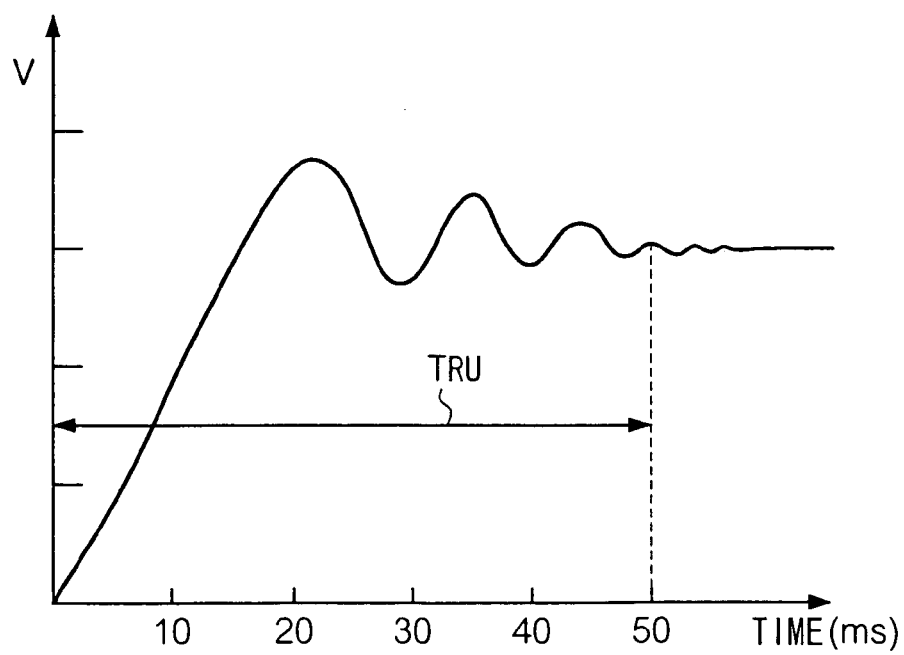
FIG. 23 is an explanatory diagram for the lockup time of the conventional PLL oscillating circuit.

As described above, according to the second embodiment, at the beginning of the operation of the PLL oscillating circuit 53, since the input terminal of the voltage controlled oscillator (VCO) 53D receives the voltage control signal which is produced by applying the offset voltage signal SCV2 on the voltage control signal SCV 1, lockup time TRU of this embodiment (10 msec as shown in FIG. 22) becomes shorter than lockup time of conventional PLL oscillating circuit (50 msec as shown in FIG. 23).

Therefore, compared to conventional way, it is possible to quickly start information processing operation. Further, from a viewpoint of control program, it is possible to omit waiting time routine that holds operation until the PLL oscillating circuit becomes stable, thereby enabling to ease software development.

Further, it is possible to improve response in various operation of the information processing apparatus.

[2.5] Modifications of the Second Embodiment

[2.5.1] First Modification

In the above description, the A/D converter 53G determines voltage of the LPF 53C when the PLL oscillating circuit 53 is locked during examination conducted in advance. Then the A/D converter 53G A/D converts the output voltage data that corresponds to this voltage and outputs it to the CPU. However, it is possible to configure as follows. At a prescribed timing (on every predetermined hour, for example), the control voltage input to the voltage controlled oscillator when the PLL oscillating circuit is locked up is A/D converted and set as a new output voltage data, thus, correcting the offset voltage in real-time.

By this, it is possible to set an offset voltage based on the newest data, to remove errors of environmental factor such as temperature change, and to reach the lock up state more quickly.

[2.5.2] Second Modification

Figure 24:
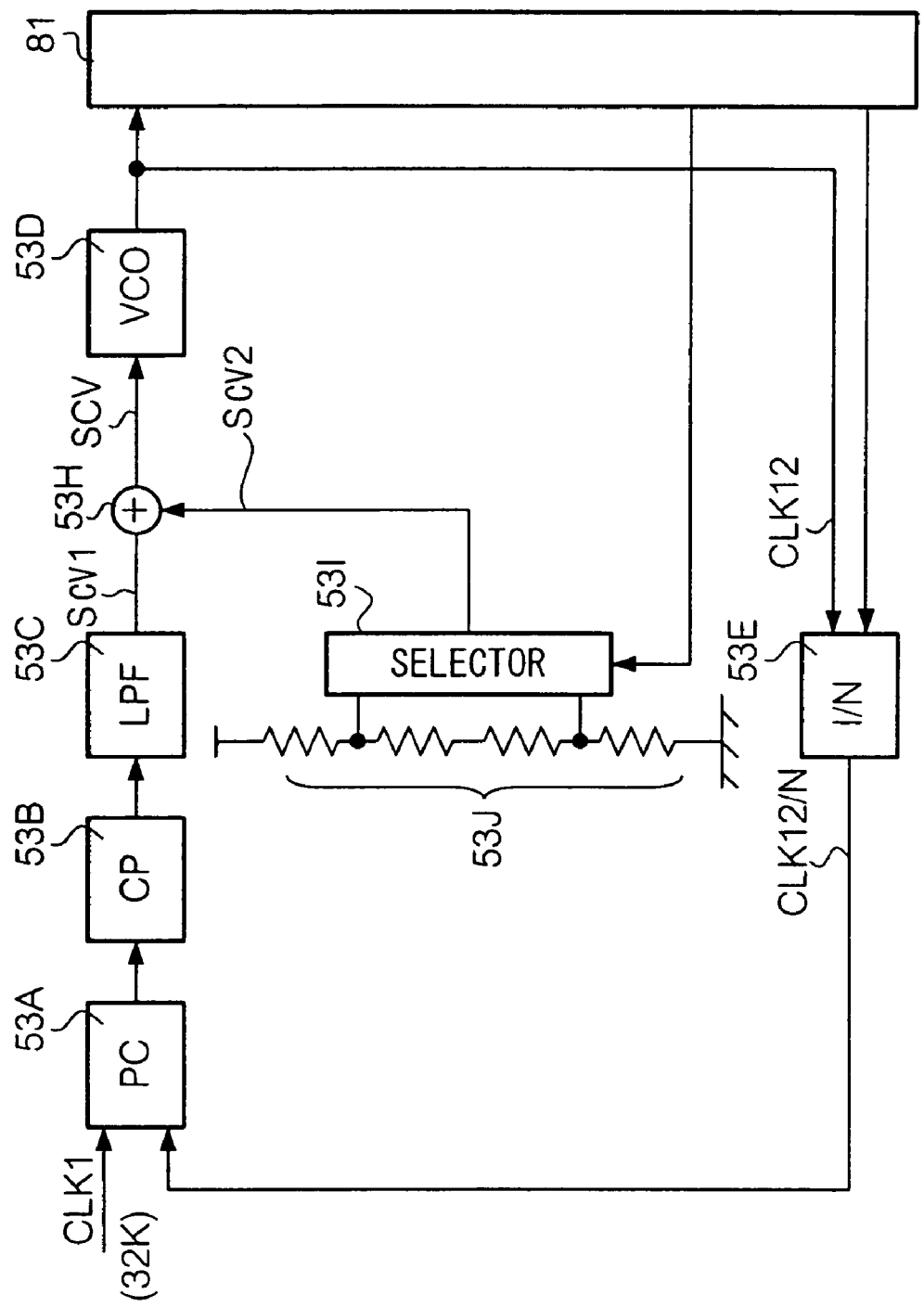
FIG. 24 is a schematic configuration block diagram of a modification of the second embodiment.

In the above description, D/A converter is used for generating the offset voltage signal SCV2. However, as shown in FIG. 24, it is possible to generate a desired offset voltage signal SCV2 by using an externally attached ladder-resistor 53J and selecting a tap location by the selector 53I.

In addition, if a prescribed voltage is necessary as an offset voltage, it is possible to omit the selector 53I from the above configuration.

[3] MODIFICATIONS OF THE EMBODIMENTS

[3.1] First Modification

In the above description, when a prescribed oscillation stable time has passed, oscillating circuit in use is switched from CR oscillating circuit to PLL oscillating circuit. However, this switching may be carried out based on a signal indicating that PLL oscillating circuit has locked up (in the above-mentioned embodiment, the control signal CNT6 having "H" level).

[3.2] Second Modification

In the above description, for a first oscillating circuit, an explanation is given only of a case of a CR oscillating circuit. However, it is possible to use a configuration that comprises a quartz oscillator circuit or a ceramic oscillating circuit on the assumption that it is used until the oscillation of the PLL oscillating circuit becomes stable.

[3.3] Third Modification

In the above description, an explanation is given only of a watch-type information processing apparatus. However, if an information processing apparatus is a twin-clock type information processing apparatus, it is possible to apply the present invention to a personal digital assistant (PDA), a portable information processing apparatus such as a note book type personal computer, or especially a information processing apparatus using a secondary battery.

[3.4] Fourth Modification

In the above explanation, oscillations of CR oscillating circuit and PLL oscillating circuit are started at the same time. However, it is possible to start CR oscillating circuit first and then start PLL oscillating circuit. In this case, from the oscillation of the CR becomes stable to the oscillation of the PLL oscillating circuit becomes stable, the output signal of the CR oscillating circuit is used. After the oscillation of the PLL oscillating circuit becomes stable, the output signal of the PLL oscillating signal is used.

[3.5] Fiftrh Modification

In the above explanation, one case is explained where a control program for selecting from two oscillating circuits which have different oscillation stability time and operating voltage is stored on memory of the watch-type information processing apparatus.

However, a program for making an information processing apparatus function in a same way as a watch-type information processing apparatus disclosed in the above embodiments may be stored on a network-connected computer to distribute through a telecommunication line.

Also, such program may be recorded on a recording medium (such as semiconductor memory, magnetic optical disc, or magnetic disc) readable by a computer to be distributed.

In this case, as an interface for installing the control program in the information processing apparatus, a conventional connector, optical communication using for example infrared light, or magnetic communication using magnetic connection, may be used.

Then the program is stored on memory of the information processing apparatus, and the microprocessor executes the program.

[3.6] Sixth Modification

In the above explanation, CR oscillating circuit and PLL oscillating circuit are used selectively based on the operating voltage or the oscillation stability time which is a time required for the oscillation to be stable. Namely, the CR oscillating circuit whose oscillation becomes stable quickly is first used, then the PLL oscillating circuit which consumes small power consumption and can oscillate at a high frequency is used. Also, when the power supply voltage becomes lower than voltage the PLL oscillating circuit can operate at, the CR oscillating circuit which can operate at low voltage is used.

However, the number of oscillating circuits is not limited to two. The present invention can be applied to a case where more than two oscillating circuits are used. In this case, the selection of the oscillating circuit to be used may be made by considering, for example, the operating voltage, the oscillation stable time, and the power consumption of these oscillating circuits.

What is claimed is:

1. An information processing apparatus comprising:
a first oscillating circuit that generates a first clock signal by oscillation and has a first oscillation stability time, the first oscillation stability time being a time required for frequency of the first clock signal becoming stable from the start of the oscillation, the first oscillating circuit being capable of operating with a power supply voltage equal to or higher than a first minimum operating voltage that is a minimum voltage required for operation of the first oscillating circuit;
a second oscillating circuit that generates a second clock signal by oscillation and has a second oscillation stability time, the second oscillation stability time being a time required for frequency of the second clock signal becoming stable from the start of the oscillation, and being longer than the first oscillation stability time, the second oscillating circuit being capable of operating with a power supply voltage equal to or higher than a second minimum operating voltage that is higher than the first minimum operating voltage;
a power supply voltage measuring circuit that measures power supply voltage;
a switching circuit for, as long as the voltage measured by the power supply voltage measuring circuit is not higher than the second minimum operating voltage, selecting and outputting either the first clock signal or the second clock signal as the clock signal based on an elapsed time of the first oscillating circuit from the start of the oscillation and an elapsed time of the second oscillating circuit from the start of the oscillation, and as long as the voltage measured by the power supply voltage measuring circuit is higher than the second minimum operating voltage, selecting and outputting the second clock signal as a clock signal without considering an elapsed time of the first oscillating circuit; and
an information processing unit for, in synchronism with the clock signal, performing information processing.

2. An information processing apparatus according to claim 1, wherein the second oscillating circuit comprises:
a voltage controlled oscillator for outputting an oscillation signal having a frequency which corresponds to a voltage control signal;
a phase comparator that compares a phase of a reference clock signal and a phase of a comparison oscillation signal and outputs a comparison signal;
a low pass filter for passing a lower component of the comparison signal;
a divider for dividing the oscillation signal and outputting the comparison oscillation signal;
an offset voltage generating unit for generating an offset voltage; and
an adder for adding an output signal of the low pass filter and the offset voltage to output the voltage control signal.

3. An information processing apparatus according to claim 2, wherein the offset voltage generating unit comprises:
an offset voltage data storage unit for storing an offset voltage data in advance; and
a D/A converter for converting the offset voltage data to the offset voltage.

4. An information processing apparatus according to claim 3,
wherein the second oscillating circuit further comprises an offset voltage data generating unit for, based on the voltage control signal at a prescribed lockup state of the second oscillating circuit, generating the offset voltage data.

5. An information processing apparatus according to claim 2, wherein the offset voltage generating unit comprises:
a voltage dividing unit for dividing a prescribed power supply voltage to generate a plurality of divided voltages; and
a voltage selection unit for selecting one divided voltage from the plurality of divided voltages as the offset voltage.

6. An information processing apparatus according to claim 2,
wherein the offset voltage generating unit comprises a voltage dividing unit for dividing a prescribed voltage to generate the offset voltage.

7. An information processing apparatus according to claim 2,
wherein the prescribed lockup state is a state where the second oscillating circuit is locked up when the offset voltage generating unit does not output the offset voltage, so that the oscillation signal has a prescribed frequency.

8. An information processing apparatus according to claim 4, wherein the second oscillating circuit comprises:
a controlled voltage determining unit for determining a voltage of the voltage control signal according to a prescribed timing;
an offset data correction unit for, based on a result of determination of the controlled voltage determining unit, correcting the offset voltage to make a new offset voltage.

9. An information processing apparatus according to claim 1, wherein the first oscillating circuit is a CR oscillating circuit, a quartz oscillating circuit, or a ceramic oscillating circuit, and
the second oscillating circuit is a P11 oscillating circuit.

* * * * *

UNITED STATES PATENT AND TRADEMARK OFFICE
CERTIFICATE OF CORRECTION

PATENT NO. : 7,065,668 B2 Page 1 of 1
APPLICATION NO. : 10/936986
DATED : June 20, 2006
INVENTOR(S) : Tsukasa Kosuda et al.

It is certified that error appears in the above-identified patent and that said Letters Patent is hereby corrected as shown below:

Claim 9, column 20, line 65, change "circuit is a P11" to --circuit is a PLL--

Signed and Sealed this

Twenty-first Day of November, 2006

JON W. DUDAS
*Director of the United States Patent and Trademark Office*